(12) United States Patent
Chatfield et al.

(10) Patent No.: US 7,260,516 B2
(45) Date of Patent: Aug. 21, 2007

(54) OPTIMIZATION OF A DESIGN

(75) Inventors: Glen F. Chatfield, Bradfordwoods, PA (US); John G. Crandall, New Kensington, PA (US)

(73) Assignee: OPTIMUM Power Technology, L.P., Bridgeville, PA (US)

( * ) Notice: Subject to any disclaimer, the term of this patent is extended or adjusted under 35 U.S.C. 154(b) by 429 days.

(21) Appl. No.: 10/231,338

(22) Filed: Aug. 31, 2002

(65) Prior Publication Data

US 2003/0046049 A1    Mar. 6, 2003

Related U.S. Application Data

(60) Provisional application No. 60/361,262, filed on Mar. 2, 2002, provisional application No. 60/316,463, filed on Aug. 31, 2001.

(51) Int. Cl.
G06F 17/50 (2006.01)

(52) U.S. Cl. .............................. 703/14; 703/2; 342/378; 700/44; 700/54; 700/28; 702/19; 702/151; 702/105; 702/27

(58) Field of Classification Search .............. 702/105, 702/27; 324/239; 703/2; 342/378; 716/8; 700/44; 706/22
See application file for complete search history.

(56) References Cited

U.S. PATENT DOCUMENTS

| | | | |
|---|---|---|---|
| 4,480,480 A * | 11/1984 | Scott et al. .................... 73/769 |
| 5,274,714 A * | 12/1993 | Hutcheson et al. ......... 382/157 |
| 5,394,322 A | 2/1995 | Hansen | |
| 5,428,712 A * | 6/1995 | Elad et al. .................... 706/46 |
| 5,465,308 A * | 11/1995 | Hutcheson et al. ......... 382/159 |
| 5,682,309 A | 10/1997 | Bartusiak et al. | |
| 5,978,083 A | 11/1999 | Muller | |
| 6,018,317 A * | 1/2000 | Dogan et al. ................ 342/378 |
| 6,047,221 A * | 4/2000 | Piche et al. .................... 700/44 |
| 6,067,409 A * | 5/2000 | Scepanovic et al. ........... 716/8 |
| 6,110,214 A * | 8/2000 | Klimasauskas ................ 703/2 |
| 6,208,295 B1 * | 3/2001 | Dogan et al. ................ 342/378 |
| 6,246,972 B1 * | 6/2001 | Klimasauskas ................ 703/2 |
| 6,252,398 B1 * | 6/2001 | Goldfine et al. ............ 324/239 |
| 6,381,564 B1 | 4/2002 | Davis et al. | |

(Continued)

FOREIGN PATENT DOCUMENTS

JP     6-148038     5/1994

(Continued)

OTHER PUBLICATIONS

Phillip Gill, Walter Murray, Margaret H, Wright□□Practical Optimization, 1981□□ISBN 0-12-283950-1□□Academic Press.*

(Continued)

*Primary Examiner*—Thai Phan
*Assistant Examiner*—Cuong Van Luu
(74) *Attorney, Agent, or Firm*—Richard W. James

(57) ABSTRACT

An apparatus, system, and method for optimization. The apparatus, system, and method include a mechanism for ending an optimization when all models within one design tolerance of an optimum model have been simulated.

40 Claims, 17 Drawing Sheets

U.S. PATENT DOCUMENTS

| | | |
|---|---|---|
| 6,594,575 B2 | 7/2003 | Pflugl et al. |
| 6,751,602 B2 * | 6/2004 | Kotoulas et al. ............... 706/23 |
| 6,804,611 B2 * | 10/2004 | Mayo et al. .................. 702/27 |
| 6,850,806 B2 * | 2/2005 | Yutkowitz .................... 700/54 |
| 2001/0039480 A1 * | 11/2001 | Mayo et al. .................. 702/19 |
| 2001/0051855 A1 * | 12/2001 | Wang et al. .................. 702/19 |
| 2003/0018399 A1 * | 1/2003 | Havener et al. .............. 700/28 |
| 2003/0033105 A1 * | 2/2003 | Yutkowitz ................... 702/105 |
| 2003/0036868 A1 * | 2/2003 | Yutkowitz ................... 702/105 |
| 2003/0055614 A1 * | 3/2003 | Pelikan et al. ................. 703/2 |
| 2004/0030664 A1 * | 2/2004 | Kotoulas et al. .............. 706/22 |
| 2004/0193385 A1 * | 9/2004 | Yutkowitz ................... 702/151 |
| 2005/0197875 A1 * | 9/2005 | Kauffman ...................... 705/7 |

FOREIGN PATENT DOCUMENTS

| | | |
|---|---|---|
| JP | 10-306387 | 11/1998 |
| JP | 2001-229407 | 8/2001 |

OTHER PUBLICATIONS

R. Hooke and T. A. Jeeves, Direct Search Solution of Numerical and Statistical Problems, Journal of the ACM, Apr. 1961, pp. 212-229, vol. 8.

* cited by examiner (i) Individual (ii) Combination

OPTIMIZATION OF A DESIGN

CROSS-REFERENCE TO RELATED APPLICATIONS

The present application claims priority to U.S. provisional patent application No. 60/316,463, filed Aug. 31, 2001, which is incorporated herein in its entirety and is currently pending. The present application also claims priority to U.S. provisional patent application No. 60/361,262, filed Mar. 2, 2002, which is incorporated herein in its entirety and is currently pending.

STATEMENT REGARDING FEDERALLY SPONSORED RESEARCH

Not Applicable.

FIELD OF THE INVENTION

The present invention is directed to an apparatus, a system, and a method for creating one or more optimum solutions or designs. In particular, the present invention is applicable to a function that when plotted has multiple peaks or valleys indicating that good solutions exist in various solution regions. That function may represent the performance of a device that can be simulated, such as an engine. The present invention may employ design tolerances to reduce computing time and to terminate the optimization process.

BACKGROUND OF THE INVENTION

Engine performance simulation software has become an integral part of the engine designer's toolkit. However, optimization of a particular design using such software is often difficult and time consuming. That is due primarily to the number of parameters required to adequately characterize the engine and the interdependency of these parameters on one another. The present invention describes apparatuses, systems, and methods that help to automate the engine design process and shorten the development time to meet specified performance goals.

SUMMARY OF THE INVENTION

The present invention is directed to a system, method and apparatus for optimizing a design. In accordance with one form of the present invention, there is provided a method for finding an optimum model that includes specifying a base model that includes: (i) a variable having a value, (ii) specifying a goal that identifies a characteristic of the base model that is to be optimized, (iii) specifying a tolerance that is a minimum amount that the variable can be changed, (iv) specifying a delta that is initially set to a maximum amount that the variable can be changed, (v) running the base model, (vi) identifying the current best model to be the base model, (vii) creating a plus model by setting the variable value to the current best model value plus the delta, (viii) running the plus model, (ix) creating a minus model by setting the variable value to the current best model value minus the delta, (x) running the minus model, (xi) setting a previous best model to the current best model and setting the current best model to the best of the current best model, the plus model and the minus model, (xii) repeating steps (vii) through (xii) if the current best model is different than the previous best model, (xiii) reducing the delta, (xiv) repeating steps (vii) through (xiv) if the delta is greater than or equal to the tolerance, and (xv) identifying the current best model as the optimum model.

The present invention is also directed to a system, method and apparatus for terminating an optimization.

Accordingly, the present invention provides solutions to the shortcomings of prior optimization apparatuses, systems and methods. Those of ordinary skill in the art will readily appreciate, therefore, that those and other details, features, and advantages of the present invention will become further apparent in the following detailed description of the preferred embodiments of the invention.

BRIEF DESCRIPTION OF THE DRAWINGS

The accompanying drawings, which are incorporated herein and constitute part of this specification, include one or more embodiments of the invention, and together with a general description given above and a detailed description given below, serve to disclose principles of the invention in accordance with a best mode contemplated for carrying out the invention.

DETAILED DESCRIPTION OF THE INVENTION

Figure 1:
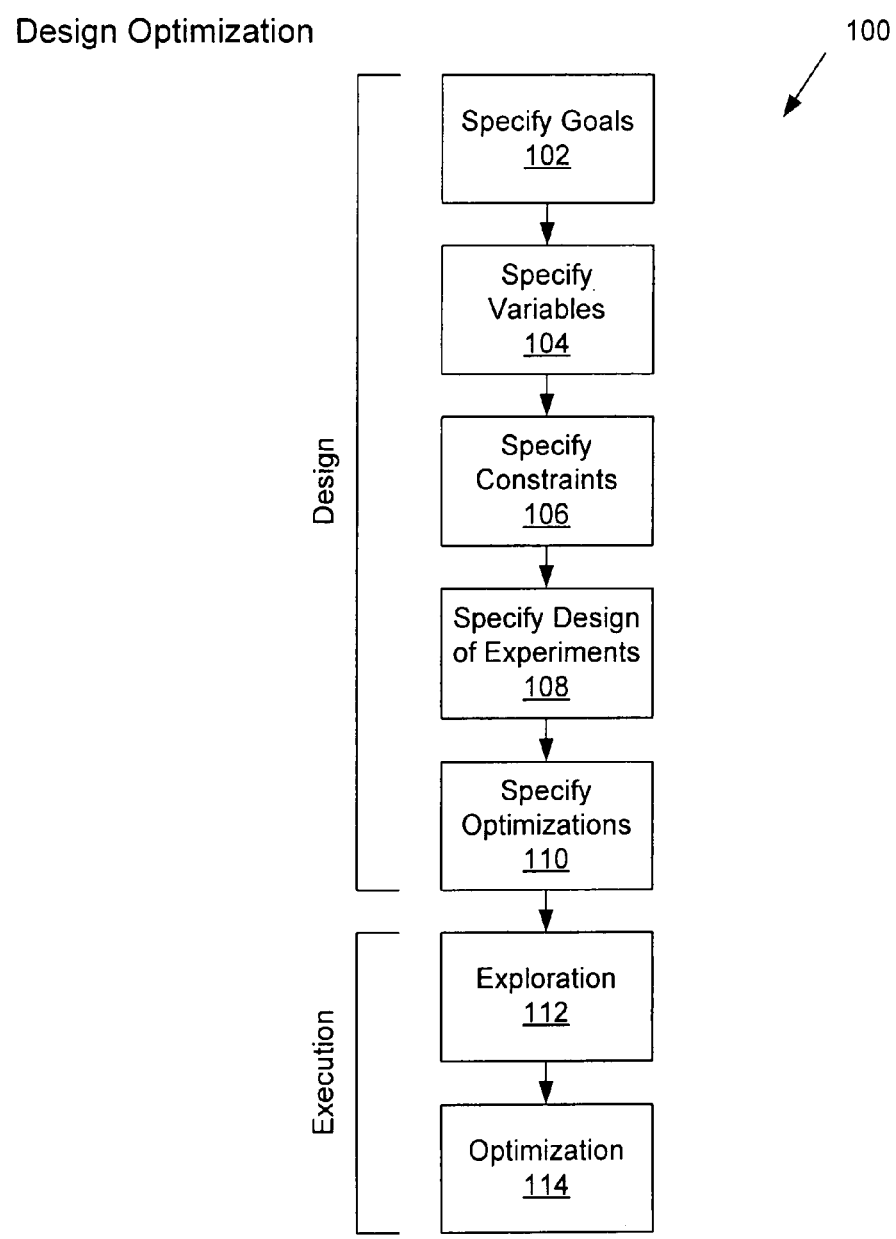
FIG. 1 is a flow diagram of an optimization method of an embodiment of the present invention.

Reference will now be made in detail to the preferred embodiments, examples of which are illustrated in the accompanying drawings. It is to be understood that the Figures and descriptions of embodiments included herein illustrate and describe elements that are of particular relevance, while eliminating, for purposes of clarity, other elements found in typical computers and computer networks.

The present design optimization provides solutions to the shortcomings of certain previous design methods and systems. Those of ordinary skill in the art will readily appreciate that while embodiments of the present invention are described in connection with engine design, aspects of the invention are applicable beyond engine design. For example, the optimization techniques disclosed and claimed herein may be applicable to optimizations for various purposes and statistical analyses in general. The computational techniques disclosed and claimed herein may be applicable to applications in which such distributed processing is beneficial. The optimization techniques disclosed and claimed herein may be utilized for purposes other than engine optimization. The user interface described herein may also be applicable in a variety of useful applications. Thus, while certain embodiments of the present invention are directed to engine design, the present invention and aspects thereof are recognized to be beneficial in a variety of applications. Other details, features, and advantages of the design optimization will become further apparent in the following detailed description of the embodiments.

Any reference in the specification to "one embodiment," "a certain embodiment," or a similar reference to an embodiment is intended to indicate that a particular feature, structure or characteristic described in connection with the embodiment is included in at least one embodiment of the invention. The appearances of such terms in various places in the specification are not necessarily all referring to the same embodiment. References to "or" are furthermore intended as inclusive so "or" may indicate one or the other ored terms or more than one ored term.

While the present invention may be utilized to optimize a variety of complex apparatuses and processes, the following embodiments are directed to use of the present invention in optimizing an internal combustion engine. Such an engine has many attributes that contribute to the operation of the engine and many desirable goals. The attributes of an internal combustion engine include, for example, valve quantity and size, piston diameter and stroke, ignition timing, fuel delivery quantity and timing, and exhaust pipe diameter and length. Goals for operation of an internal combustion engine include, for example, fuel consumption, emissions, torque, and power.

In the following description, the term "variable set" is utilized to indicate a set of variable values that may be utilized to run a single simulation. A "run" or "simulation" is an act of running a simulation on a variable set under given test conditions. A "test procedure" is a set of test conditions under which a run occurs. A "result" is the value of characteristics or dependent variables from a simulation of a set of variables according to test conditions. The term "solution" refers to one or more runs utilized to evaluate goals. The term "pass" indicates a collection of solutions that is ranked to find the best variable set or sets. The term "optimum" is utilized to indicate a local optimum, which is the best variable set from the ranked set of solutions of a pass. A "model" is a set of variables that may be simulated and a "design configuration" is a model embodying a design. It is a benefit of the present invention that it is capable of providing multiple, diverse local optimums where such multiple, diverse optimum solutions exist.

A base model or a base design configuration is a starting definition of attributes or components to be modified by rules to create an optimized design. A "best model" is a model that most closely approximates one or more specified values when the directive of the goal is to match those values, a model that provides the highest resulting value when the goal is to maximize that value, and a model that provides the lowest resulting value when the goal is to minimize that value. The base design includes all attributes necessary to simulate the design. Design attributes may be stored in a design attribute database. The design utilized in the examples herein is an engine design so that the base design configuration in those engine examples is referred to as a "base engine." Thus, those attributes may include dimensional data such as, for example, intake plenum dimensions, intake pipe length and diameter, exhaust pipe length and diameter, intake valve diameter, exhaust valve diameter, and cylinder length and diameter. Those attributes may also include other data such as, for example, sensed data including intake air pressure, exhaust air pressure, and throttle position. Attributes may furthermore be grouped logically by, for example, component such that an exhaust pipe length and an exhaust pipe diameter that are commonly used in combination may be grouped to define an exhaust pipe component. Those components may then be assigned names such that all the attributes for a component are grouped under a unique engine component name. The present optimization may then vary selected attributes and simulate operation of an engine having those varying attributes to achieve one or more goals.

FIG. 1 illustrates a Design Optimization 100 of the present invention. In the embodiment illustrated in FIG. 1, the Design Optimization 100 includes 2 phases of operation, Design and Execution. The Design includes Specifying Goals 102, Specifying Variables 104, Specifying Constraints 106, Specifying Design of Experiments 108 and Specifying Optimizations 110. The Execution Phase includes Exploration 112 and Solution 114.

At 102, an objective that contains one or more goals of the optimization is specified. The objective is a definition of the desired result of optimization. Goals may have at least three component parts: a characteristic, a directive, and a value. Each characteristic is an entity that is to be optimized, such as for example a performance characteristic of an engine. The directive instructs as to what is desired to be accomplished with the characteristic. For example, a directive may be an instruction to maximize the value of the characteristic, minimize the value of the characteristic, or match one or more desired values of the characteristic. The value provides an objective standard to compare the extent to which each design configuration approaches the desired result. In certain situations, goals that are minimized or maximized may not have an associated value, whereas goals that are to be matched typically would have at least one associated value.

The goal of the present example is the singular goal of achieving maximum power through the range of engine operation specified in the test procedure. Thus, the characteristic is power and the directive is to maximize that power.

The test procedure may, for example, specify a range of operation, a stepwise increment through the range, a number of engine cycles to simulate at each rpm step, a fuel utilized by the engine, a throttle position, and ambient conditions.

The range may be, for example, 5000 rotations per minute (rpm) to 10,000 rpm and the increment may be 1000 rpm steps throughout the range. The fuel may be, for example, gasoline or diesel. Ambient conditions include air temperature, air pressure, and humidity at intake and exhaust points.

As has been mentioned, goals may be minimized, maximized, or matched to a desired value or a set of values. Where matching is desired, the value associated with the goal may be matched to, for example, a curve or set of values defining a curve. Goals may also be utilized as limits on the design. For example, a goal may be set with a high limit, a low limit, or a band having both high and low limits. Moreover, more than one goal may be established for a simulation. Thus, for example, a user may attempt to match a desired power curve while setting a particular high limit on carbon monoxide in the exhaust of an engine. In that example, all results producing a carbon monoxide level greater than the limit will be disregarded and the best fits to the power curve having a carbon monoxide level below the limit will be provided as results.

The high limit is the specification of a value or set of values for a parameter above which a design configuration is unacceptable. A high limit may, for example be placed on a parameter such as fuel consumption to prevent a resulting design from being overly inefficient as to fuel consumption. If the high limit is exceeded at any point, then the simulation may be considered to have failed for that variable set.

The low limit is the specification of a value or set of values for a parameter below which a design configuration is unacceptable. A low limit may, for example be placed on a parameter such as power to prevent a resulting design from having too little power. If a variable set produces a value that is below the low limit at any point during the simulation, then the simulation may be considered to have failed for that variable set.

A limit band includes a high and low limit, such that if the high limit is exceeded for a set of variables at any point during the simulation or the variable set produces a value that is below the low limit at any point during the simulation, then the simulation may be considered to have failed for that variable set.

A failed variable set typically is not used in the ranking of variable sets to determine the best result.

A strategy is a process used to obtain an objective. A strategy includes one or more variables and may or may not contain one or more constraints.

At 104, the variables to be optimized are specified. "Optimized" variables are those variables that are to be varied in the optimization simulations in order to accomplish the goals. Two variables are to be optimized in the embodiment described as an example herein; exhaust pipe length and exhaust pipe diameter. An initial value of each variable to be optimized may be assigned. Boundaries of values for which the simulation is to be run are then set. It has been determined for the present application that an exhaust pipe having a length of between 100 mm and 1000 mm is desired to fit the vehicle that the engine is operating. It has also been determined for the present application that an exhaust pipe having a diameter of between 100 mm and 200 mm is desired to fit the vehicle. Since only exhaust pipes having a length between 100 and 1000 mm will be considered, the boundaries for exhaust pipe length are 100 mm and 1000 mm. Similarly, the boundaries for exhaust pipe diameter are 100 mm and 200 mm. Where each variable represents an axis of a grid, the area encompassed by the boundaries may be viewed graphically and referred to as a "design space."

The number of engines to be simulated may be limited, for practical purposes, by use of tolerances with variables or attributes that are permitted to vary during optimization. A tolerance may be set at a minimum increment desired for a variable such that variable values to be simulated will be limited to values falling at tolerance points. Without use of a tolerance, an infinite number of designs to be simulated would exist in any design space. By utilizing tolerances, infinitely small steps in the design space are eliminated and a finite number of simulations is forced to exist in a design space. When tolerances are used, variable values to be simulated are rounded to the nearest tolerance point so that values falling between those points are not simulated. A design tolerance may be equal to a manufacturing tolerance but may also be simply the amount of each step that a designer wishes the optimization to consider. For example, it may be desired to consider exhaust pipes in lengths having 10 mm increments and diameters having 1 mm increments. Thus, a tolerance for exhaust pipe length may be set at 10 mm and a tolerance for exhaust pipe diameter may be set at 1 mm. Graphically, the bounded design space may now be viewed as a grid having points located on every multiple of each tolerance. With regard to tolerances, a global tolerance may be set that is based upon a function of that variable such as the magnitude of the variable. Where desired, however, the tolerance for a variable may be set to any value. Tolerances may also be offset so that tolerance points may begin at other than zero or another multiple of the tolerance. Thus, for example, an exhaust pipe may be desired to be considered in 10 mm increments beginning a 25 mm, thereby providing a tolerance offset. The exhaust pipe lengths to be considered would then be in 10 mm increments from 25 mm (e.g., 25 mm, 35 mm, 45 mm, etc.).

Optimization having variables set at tolerances also provides a natural termination for the optimization program. Once all tolerance points around a point from which optimization is occurring have been simulated and do not yield a better value for the characteristic, the optimization may be terminated. Use of tolerance based simulation, furthermore, beneficially reduces the number of simulations run because variable values that are near each other are rounded to the same tolerance point and simulation of the same point need not be performed twice. Rather, the present invention is capable of recognizing that a variable set to be simulated is the same as a variable set previously simulated and so does not simulate that same variable set a second time.

At 106, constraints, including parametric equations, are specified. An initial design attribute may be defined as a constant value or by a parametric equation. Parametric equations are referred to herein as a type of constraint. A parametric equation defines an attribute in terms of one or more other attributes. An attribute that is defined by a parametric equation is not typically optimized. It may, however, change as variables being optimized change. For example, the entrance diameter of a pipe may be defined as being equal to the diameter of a port to which it connects. Alternately, a parametric equation could define the geometry of a component, such as a parallel pipe, by equating the exit diameter to the entrance diameter. Thus it is assured that only configurations in which inlet and outlet of the pipe are equal will be considered. As another example of a parametric equation, the stroke of an engine may be based on the displacement and bore to stroke ratio of the engine.

In an embodiment of the present invention, variable sets for design configurations in the design space are simulated in two steps. The first step, called exploration herein, simulates variable sets in various regions of the design space and the second step, called optimization herein, simulates design configurations in the most promising regions of the design space. In exploration, a small number of variable sets are selected to determine which region or regions in the design space are most promising. Thus for example, three values for each variable may be selected so as to be dispersed evenly across a range of values to be considered for each variable. In optimization, design configurations adjacent to the most promising design configurations explored in exploration are simulated to find optimum solutions in those regions.

At 108, attributes for a design of experiments are specified. The design of experiments attributes determine how many design configurations will be simulated in exploration 112 and optimization 114. Design of experiments attributes include a number of levels to be explored for each variable, the number of best runs desired for further consideration, the number of other regions desired for further consideration, and a number of runs limit. The level is a number of values for each variable that are to be considered during exploration. Viewed graphically with each variable defining an axis on a graph beginning with the lowest value to be considered and ending with the highest value to be considered, levels are a number of points to be simulated on each axis in exploration 112. The number of solutions to be simulated for exploration 112 is, thus, the product of the number of levels for each variable.

Global or local levels may be set for the variables when specifying the design of experiments 108. When global levels are assigned for all variables, the same number of values are considered for each variable. For example, a global level of 3 may be provided by default. Where three values are selected for each value, the number of design configurations that will be considered in exploration is $3^n$, where n is equal to the number of variables in the design configuration.

When local levels are set for each variable, the number of values to be considered during exploration is selected individually for each variable. Furthermore, a global level may be provided as a default and overriding local levels may be specified for one or more of the variables being explored. A level of zero may also be specified such that exploration 112 is disabled for a variable. Alternately, values may be specified by a user for consideration in exploration 112 or another technique may be utilized to select the values to be used in exploration 112.

A number of best runs may be specified to instruct optimization 114 as to how many design configurations are to be retained because they most closely approximate the goal. Those best design configurations often lie close to each other in a single region. The best design configurations may, however, lie in disparate parts of the design space and may result from optimizing more than one design configuration found in exploration 112.

It may be desired that optimum design configurations in one or more local optimum regions of the design space (regions not containing the best design configuration) be provided. For example, solutions in a local optimum region may be close enough to the goal to satisfy a designer and may be substantially more cost effective to implement. Thus, a number of other regions may be specified to provide so that design configurations in local optimum regions are also provided by optimization 114.

A number of runs limit may also be specified such that a limit is placed on the number of design configurations to be simulated. The number of runs limit may be accomplished by randomly selecting design configurations to be simulated from the total number of design configurations that could be simulated. A random number seed may, furthermore be specified in a computer system so that the same design configurations may be simulated by choosing the same seed and different design configurations may be simulated by selecting a different seed.

Figure 7A:
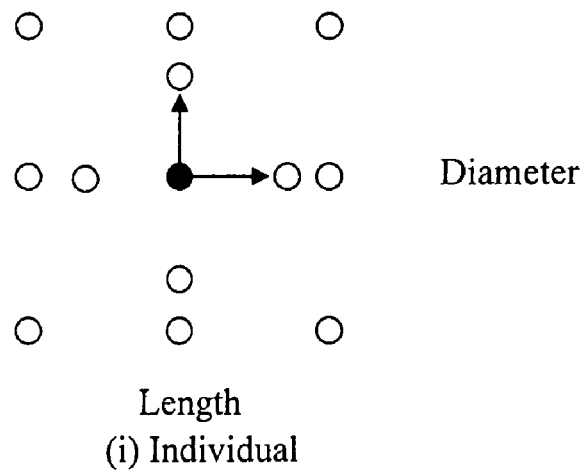
FIG. 7a illustrates design configurations simulated in a solutions pass occurring for two variables independently in an embodiment of the present invention.
Figure 7B:
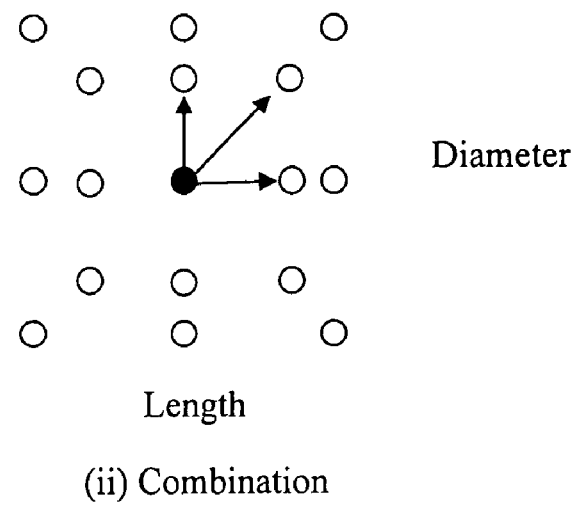
FIG. 7b illustrates design configurations simulated in a solutions pass occurring for two variables in combination in an embodiment of the present invention.

Optimizations are specified at 110. In optimization, adjacent design configurations are simulated by stepping from a base design simulation to adjacent design configurations to find optimum solutions in each region selected in exploration 112. In the optimization specification phase, a determination of whether and how variables are to be combined in optimization 114 is made. As has been explained hereinbefore, variables may be optimized individually or in combination. Steps may be applied during optimization 114 as "individuals" where only one variables is changed when simulating adjacent design configurations or as "combinations" where a combination of at least two variables are changed when simulating adjacent design configurations. FIG. 7a illustrates an example wherein variables are changed individually, creating four new design configurations to be simulated and FIG. 7b illustrates an example wherein variables are changed in combination, creating eight new design configurations to be simulated. As may be seen by that example, many more design configurations are presented for consideration by the optimization system when parameters are considered in combination than individually.

It may be noted that all variables may be combined or uncombined or subsets of the variables may be combined in one or more combinations.

In addition, step and step delta start and end factors may be specified, a threshold may be specified, an optimization methodology may be specified, and a limit on the number of runs for each pass of the optimization may be specified. Step size is defined for each variable. A step, in turn, defines an area on a grid, plus or minus from a base point, that will be considered in optimization. One useful step size is the distance between exploration points, which causes optimization to occur from a base point to each surrounding exploration point. Step delta start and end factors may be defined as percentages of the step or portions of the step. A step delta start factor defines the distance from a base point, as a portion of a step, at which the first optimization pass will occur. A step delta end factor defines the distance from a base point, as a portion of a step, at which the last optimization pass will occur if the optimization is not terminated by other means. Moreover, one or more variables may be eliminated from the optimization 114 because those variables were only necessary for exploration 112.

The step delta factors are used by the optimization to determine a new value for a variable set based on a portion of the distance between two adjacent points on the exploration grid. The threshold is evaluated at each pass to determine whether the optimization is complete. The optimization may thus terminate upon reaching a threshold or may terminate prior to reaching a threshold for other reasons. For example, another reason that optimization may terminate is because design configurations for all tolerances in the design space surrounding the base point have been simulated and no better result was found.

The optimization methodology for the present embodiment is based on a steepest decent analysis. Alternately, a downhill simplex or other form of analysis may be utilized. Downhill simplex does not allow any combinations and may not perform ideally in combination with tolerances, since it depends upon small changes to keep it progressing.

A limit for the number of runs to be simulated in each pass may be specified if such a limit is desired and a random number seed may be specified in case the limit is exceeded.

During exploration 112, the design space is explored combining all the variables based upon the levels of each variable or other specified values. A baseline simulation may be run initially. The baseline simulation may be run for comparison to other simulated configurations. Thus, for example, an engine for a vehicle may be optimized for power by varying exhaust pipe length and diameter. The simulation may utilize values from the baseline simulation that define a complete engine for all design configurations while varying values for exhaust pipe length and diameter only. Thus, if an engine to be optimized is currently utilizing an exhaust pipe that is 700 mm long and 150 mm in diameter, power may be determined for that configuration over a desired range of engine speeds for the baseline simulation. The range of engine speeds for this example will be 5000 to 10,000 rpm. The result of the baseline simulation may then be compared to each other variation of exhaust pipe length and diameter examined during the optimization.

It is not necessary, however, to run a baseline simulation. Simulation results may simply be ranked to determine which configurations of the variables are best. Exploration 112 may calculate the result (in the present example engine power) at the various defined points within the boundaries set for the variables (in the present example exhaust pipe lengths from 100 mm to 1000 mm and diameter from 100 mm to 200 mm). Those results may then ranked to determine which configurations of the variables provide the best results.

Figure 2:
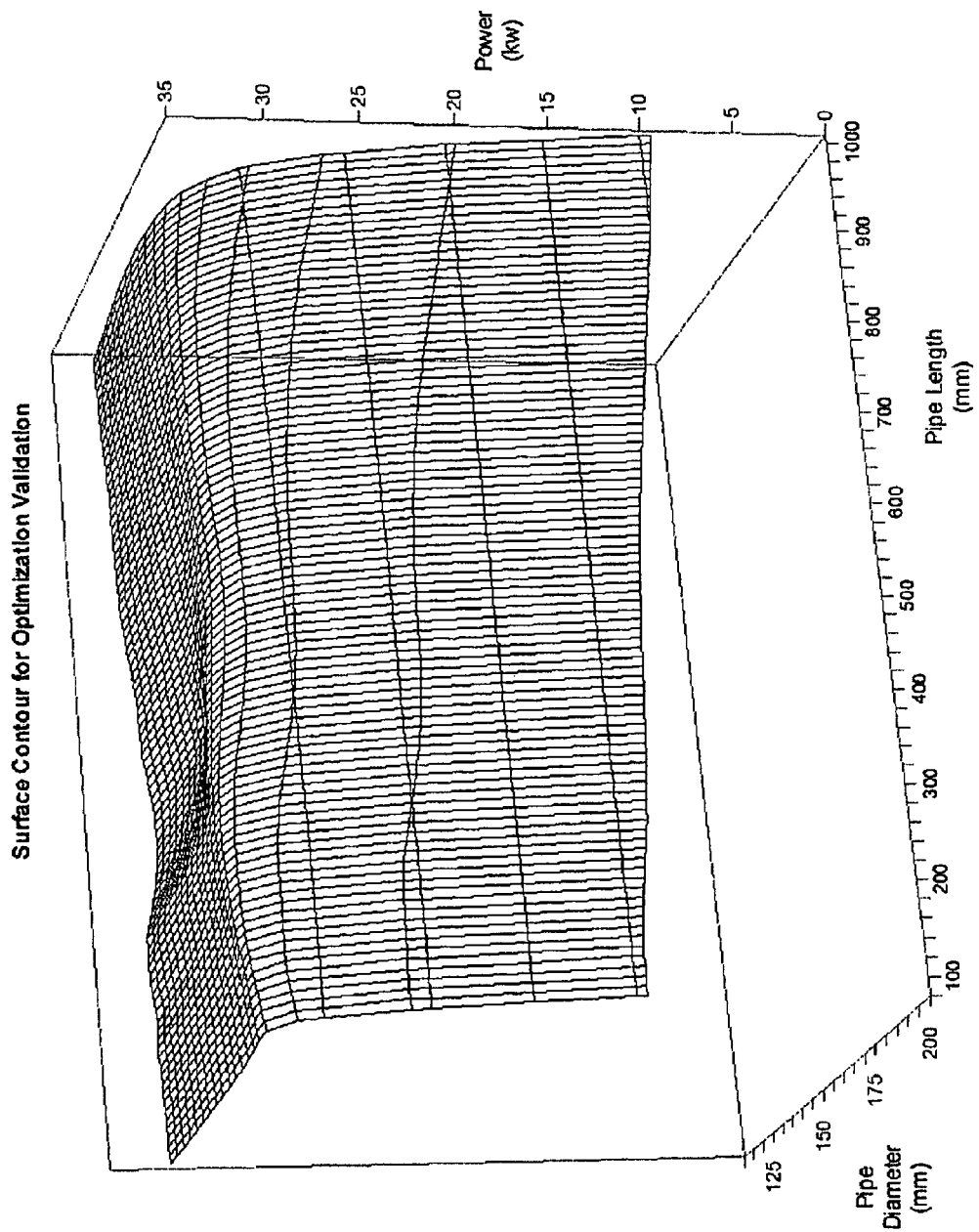
FIG. 2 is a surface contour produced by simulations wherein exhaust pipe length and diameter are optimized variables.

FIG. 2 depicts a set of simulations of exhaust pipe length and diameter graphically. Power performance is depicted topographically on a landscape plane with the minimum exhaust pipe length of 100 mm set as a left boundary, the maximum exhaust pipe length of 1000 mm set as a right boundary, the minimum exhaust pipe diameter of 100 mm set as a lower boundary and the maximum exhaust pipe diameter of 200 mm set as an upper boundary. In FIG. 2, exploration was performed in fine resolution to demonstrate an example of the values of the power contour in the design space.

Figure 3:
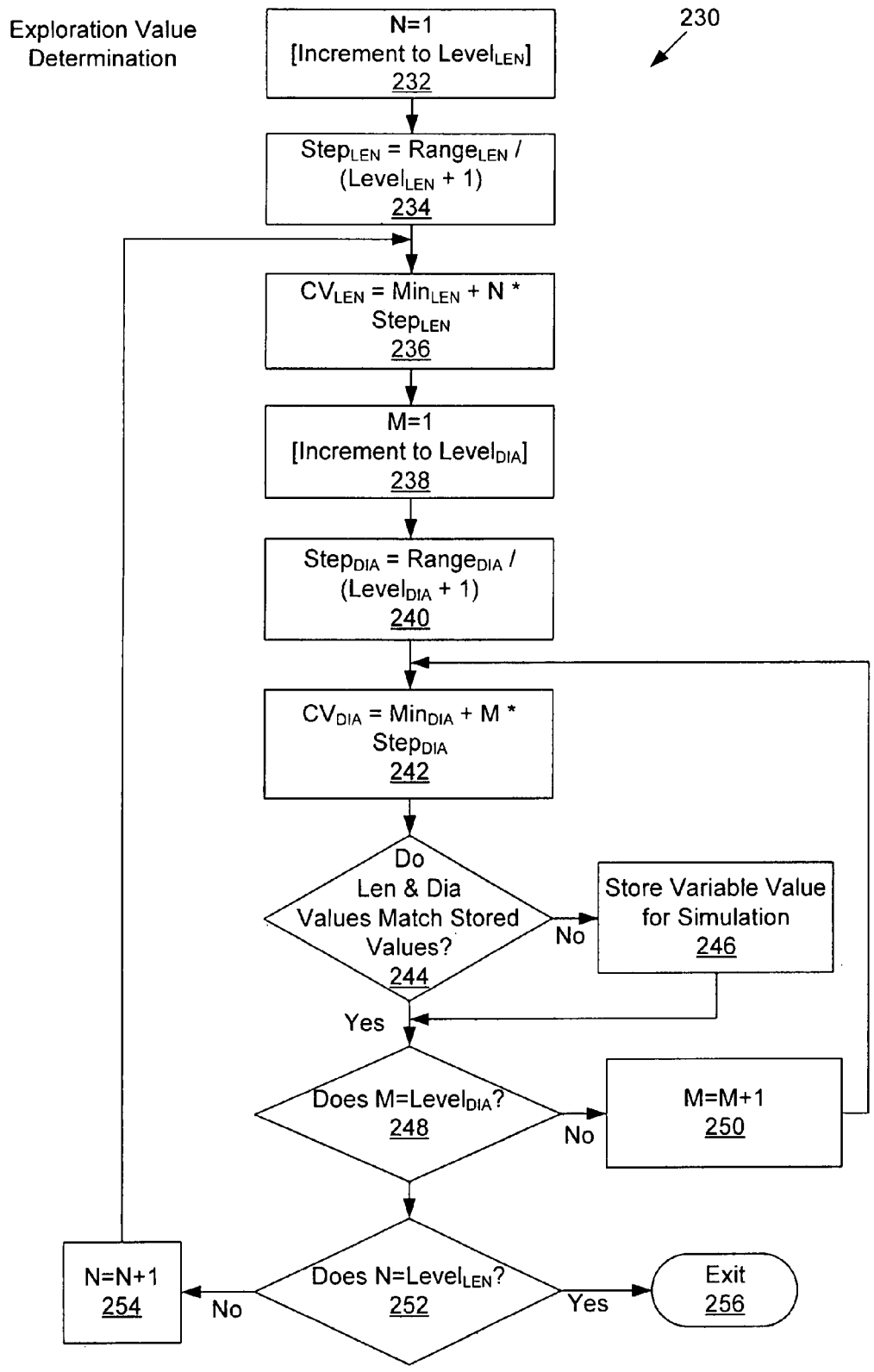
FIG. 3 is a flow diagram of a method of determining combined values in an embodiment of the present invention.

FIG. 3 illustrates a method of determining combined values 230 for exploration 112 of the present invention. The method 230 operates visually to create a two-dimensional grid corresponding to two variables. It should be recognized, however, that the present invention may be utilized to optimize any number of variables. The range for each variable is equal to the maximum boundary value for that variable less the minimum boundary value for that variable. At 232, a counter "N" is set to 1. As will be seen at 252 and 254, that counter will be incremented until it reaches the level set for the first variable which, in the embodiment illustrated, is exhaust pipe length ("Len"). At 234, a step is calculated that divides the range for length into equal portions. A variable value for the first division of length is calculated when 236 is first executed. Thus, graphically, the distance on an X-axis from the minimum length into the length range for the first design of experiments point is determined at 236. The distance on a Y-axis from the minimum diameter to that first design of experiments point must next be determined to pinpoint the first design of experiments point. Thus, a nested loop for exhaust pipe diameter is entered at 238. At 238, a counter "M" is set to 1. As will be seen at 248 and 250, that counter will be incremented until it reaches the level set for the second variable which, in the embodiment illustrated, is exhaust pipe diameter ("Dia"). At 240, a step is calculated that divides the range for diameter into equal portions. A variable value for the first division of diameter is calculated when 242 is first executed. Thus, in the present embodiment that considers only two variables, the exhaust pipe length and exhaust pipe diameter of the first design of experiments point to be simulated is the intersection of the length resulting from step 236 and the diameter resulting from step 242.

In a certain embodiment wherein duplicate variable values may be produced by the method described in FIG. 3, variable values to be simulated are stored in a database or table. After each iteration wherein a new set of variables to be used to run a simulation is developed, the variable set is compared to the variable sets stored in the database. Thus, if a variable set already exists in the database, the duplicate variable set may be discarded so as not to waste simulation resources. Therefore, at 244, the length and diameter determined at 236 are 242 are compared to values previously calculated and stored in a database. If the length and diameter values match previous values, the current values are not stored and the method returns to 248 to calculate the next design of experiments point. If, however, the length and diameter values do not match any saved in the database, then the current design of experiments values are saved in the database at 246 for future simulation.

At 248, if counter "M" is less than the level selected for second variable "diameter," then counter "M" is incremented at 250 and the process returns to 242 to calculate the desired diameter value for the next step. When counter "M" is equal to the level selected for second variable "diameter" then the process proceeds to 252. At 252, if counter "N" is less than the level selected for first variable "length," then counter "N" is incremented at 254 and the process returns to 236 to calculate the desired length value for the next step. When counter "N" is equal to the level selected for first variable "length" then the process ends at 256.

It should be recognized that values calculated in the design of experiments value determination method 230 of FIG. 3 need not be saved in a database but may, for example, be simulated immediately after they are calculated. The method described in connection with FIG. 3, however, beneficially eliminates duplicate simulation. It should also be noted that when the loop for the first variable is incremented, it is not necessary to recalculate the diameter points because the diameter values will match those calculated in the first pass. Thus a recursive algorithm, may beneficially be employed to efficiently determine the design of experiments points to be simulated.

Figure 4:
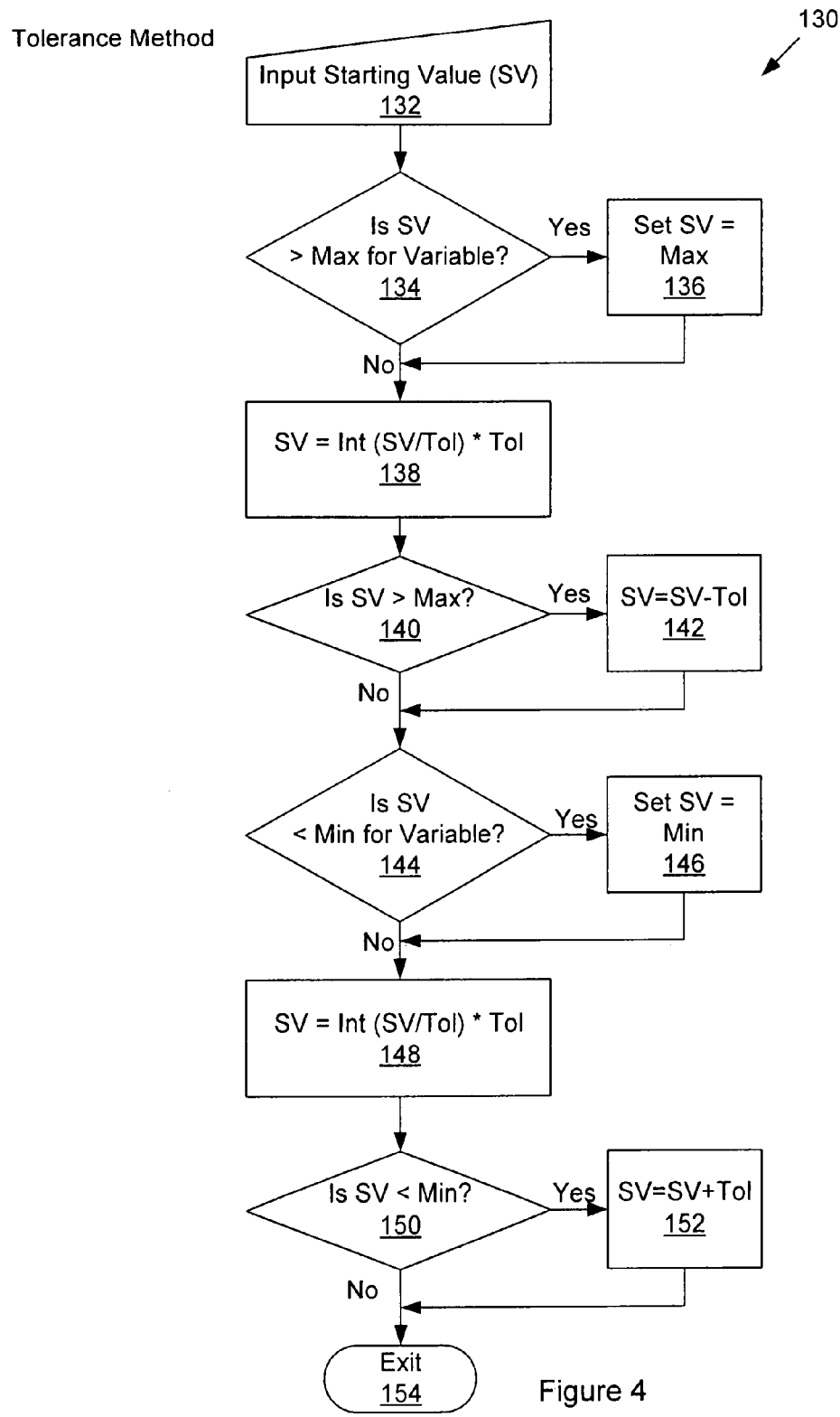
FIG. 4 is a flow diagram of a tolerance method in an embodiment of the present invention.

FIG. 4 depicts a tolerance method 130 that assures the value of a variable to be utilized in a particular run is within the desired range and of the desired magnitude to fall on a tolerance point. Where, as in the present embodiment, there are multiple variables being considered in each solution, the method of selecting the parameters for a variable 130 will have to be performed once for each variable being considered. At 132, a desired starting value is input into the tolerance method. At 134-142 the tolerance method 130 assures that the input starting value is not greater than the maximum boundary set for that variable and at 144-152 the tolerance method 130 assures that the input starting value is not less than the minimum boundary set for that variable.

At 134, the starting value is checked to determine whether it is greater than the maximum boundary for that variable. If the starting value is greater than the maximum boundary set for that variable then the starting value is given the value of the maximum boundary at 136. At 138, the starting value is set equal to the integer of the starting value divided by the tolerance and that value is multiplied by the tolerance. A value other than an integer may alternately be specified at 138. Thus, at 138 the starting value is always set at a multiple of the tolerance. As an example, if an exhaust pipe length of 1005 mm is input, the maximum length to be considered is 1000 mm, and the tolerance is 10 mm, then the starting value will be set equal to the 1000 mm maximum length at 136. The integer of (1000 mm / 10 mm) * 10 mm is 1000 mm. Thus it is confirmed that 1000 mm is a multiple of the tolerance of 10 mm.

Where a rounded integer function is used at 138 and a boundary is not set at a multiple of the tolerance, it is possible for the result of the equation of 138 to fall outside of the boundary. Therefore, at 140 and 142, the method will subtract one tolerance from the starting value if the starting value is greater than the maximum boundary set.

At 144, the starting value is checked to determine whether it is less than the minimum boundary for that variable. If the starting value is less than the minimum boundary set for that variable then the starting value is given the value of the minimum boundary at 146. At 148, the starting value is set equal to the integer of the starting value divided by the tolerance and that value is multiplied by the tolerance. Thus, at 148 the starting value is always set at a multiple of the tolerance. At 150 and 152, the method will add one tolerance from the starting value if the starting value is less than the minimum boundary set and at 154 the tolerance method terminates.

During exploration 112 sets of values for the variables spread evenly within the boundaries may be generated and simulations run for each of those sets. In the present embodiment, all sets of values to be explored are calculated first and then each simulation is run. A benefit to that ordering is that multiple simulations may be run simultaneously. That ordering is particularly advantageous where the simulations are performed on a network of computers wherein multiple processors are available to run simulations simultaneously. Simulations may, however, alternately be run as the variable values are determined.

Figure 5:
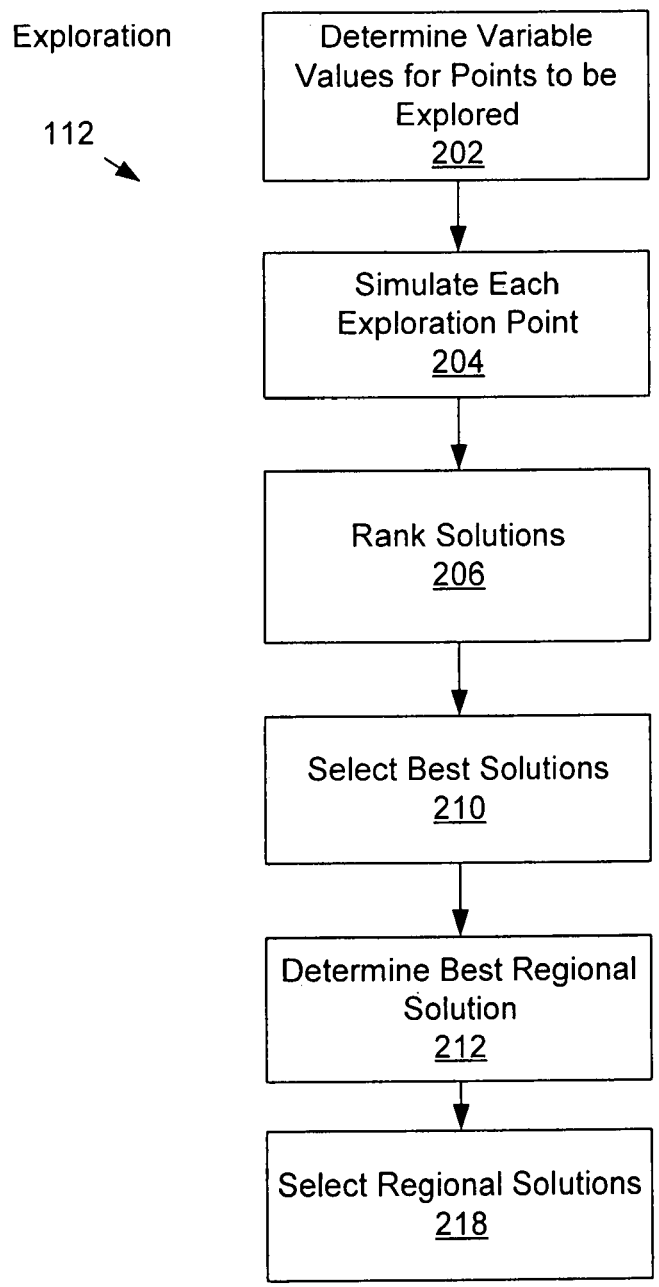
FIG. 5 is a flow diagram of a method of performing exploration in an embodiment of the present invention.

FIG. 5 illustrates a method of performing exploration 112 of the present invention. At 202, values for variables at various design of experiments points within the boundaries are determined. Those points are typically located grid-like between the boundaries set for each variable to arrive at a sampling of solutions across the entire range of values to be considered. At 204, a solution is run on each design of experiments point and a result for the goal is determined for each of those design of experiments points. At 206, the solutions are ranked with the solution most closely approaching the goal ranked first and the solution farthest from the goal ranked last. The number of best solutions desired are collected at 210. At 212, the best regional solutions are determined by, for example, using a steepest climb analysis. The steepest climb analysis includes (i) determine the steepest climb at each point, and (ii) create a collection of all points that did not climb toward any adjacent point. A climb occurs where an adjacent point has a more desirable result. The steepest climb occurs toward the point having the most desirable result of all adjacent points. At 218, any points that were determined to be best solutions at 210 are eliminated and the best regional solutions are ranked. Next, at 218 a number of regional best solutions equal to the number of other regional solutions desired is selected.

If the number of runs created in exploration 112 exceeds the number of runs limit, then variable sets are either selected or deselected until the number of simulations to be run is equal to the runs limit. Selection or de-selection may be based on a randomization. Moreover, the randomization may be seed based such that the results are repeatable or modifiable as desired.

Figure 6:
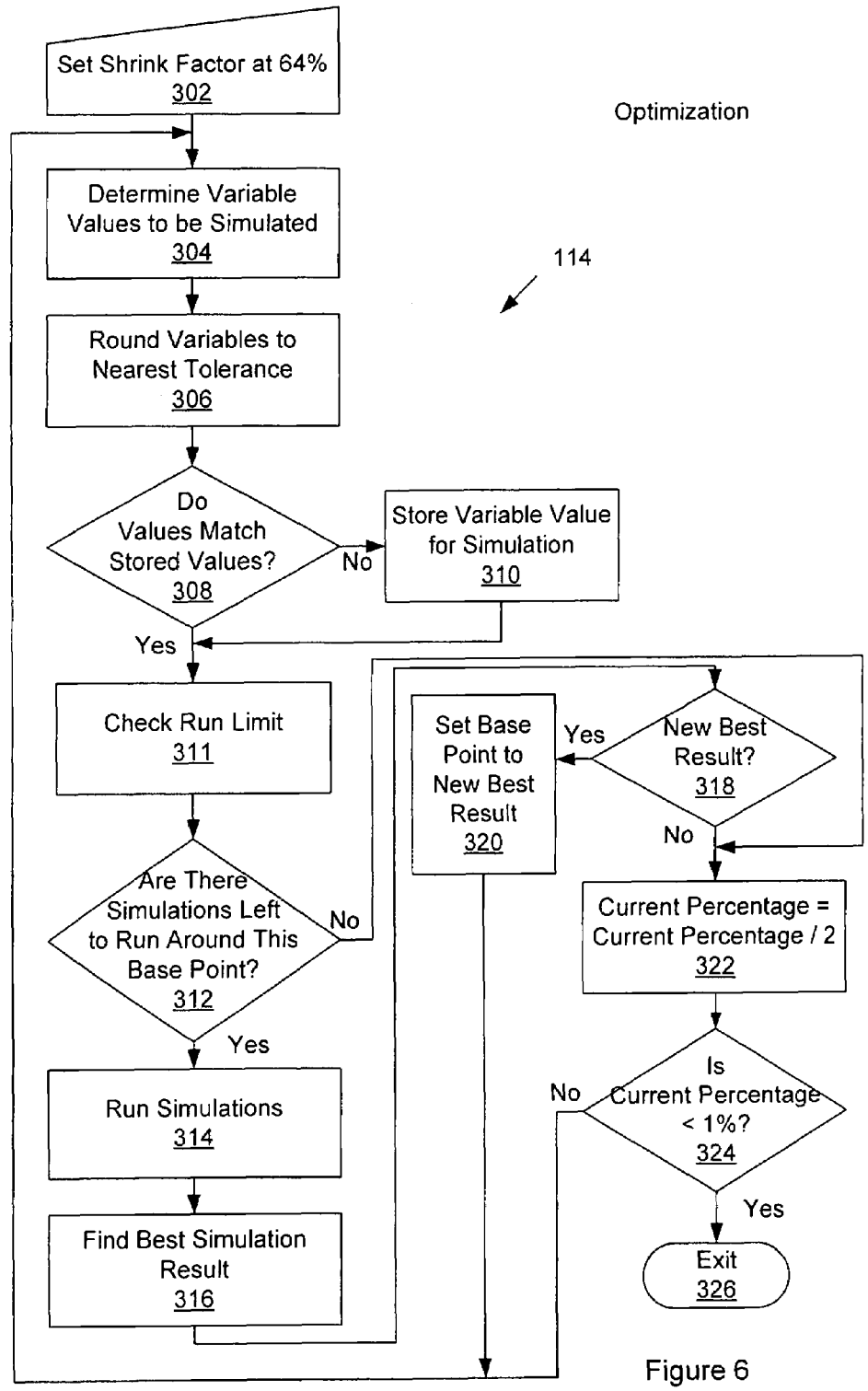
FIG. 6 is a flow diagram of a method of performing optimization in an embodiment of the present invention.

FIG. 6 illustrates optimization 114. The term "base point" will be utilized to describe a point from which a solution pass will occur. Optimization simulates design configurations adjacent to base points and selects the best design configuration. That best design configuration for the pass is the design configuration that results in a value or values most nearly approximating the desired goal value or values. The best design configuration from a pass then becomes the base design for the next optimization pass. If none of the generated design configurations in a pass improve on the base design configuration then design configurations in the design space nearer to the base design will be simulated in the next pass. When a new base engine is selected for the next pass, the process is termed "migration." When the same base engine is retained for the next pass and simulation of design configurations nearer that base design are performed, the process is termed "shrink." Thus, in migration, the base engine is moved from one location on the grid to another so that additional engines may be generated around that improved engine. In shrink, the base engine is maintained in its current location and alternative engines nearer to that base engine are generated.

Step size is based on the step delta specified during specification of optimization 110. The optimization may continue the process of migration and shrink until a step delta end factor has been reached or design configurations for all tolerances adjacent to the base point have been simulated and no better result of the characteristic was found. Thus, for example, the step delta start factor may be 64% of the step delta and the step delta end factor may be 1% of the step delta. Designs may, thereby, be simulated 64% of the step from the base point initially, then 32% of the step from the base point, 16% of the step from the base point, 8% of the step from the base point, 4% of the step from the base point, 2% of the step from the base point, and 1% of the step from the base point as shrinkage passes occur. As has previously been noted, during migration, engine designs from previous passes that overlap on the current pass may not be selected for regeneration since they were previously generated.

The optimization begins at 302 by setting a shrink factor to the step delta start factor previously specified. It has been found through experimentation that a first pass having a shrink factor that is equal to 64% of the step size between exploration points is beneficial and so a 64% shrink factor will be used in the following example and the distance between exploration points for each variable will be used as the step size for each variable.

At 304, values for simulations propagating from the current base point are determined. As may be seen in FIGS. 7a and 7b, each solution pass may be performed individually or in combination. FIG. 7a illustrates a solutions pass occurring for length and diameter variables individually, while FIG. 7b illustrates a solutions pass occurring for length and diameter variables simultaneously. In the present two variable example, performing a solutions pass on the variables individually would cause the simulator to select additional values to be simulated that are adjacent to the base point at (i) the base point length value and the base point diameter value plus 64% of an exploration step in the diameter direction, which may be referred to as a plus model for diameter, (ii) the base point length value and the base point diameter value minus 64% of an exploration step in the diameter direction, which may be referred to as a minus model for diameter, (iii) the base point length value plus 64% of an exploration step in the length direction and the base point diameter value, which may be referred to as a plus model for length, and (iv) the base point length value minus 64% of an exploration step in the length direction and the base point diameter value, which may be referred to as a minus model for length, as plotted on FIG. 7a. In the present example, performing the solutions pass on the variables in combination would cause the simulator to select the additional values selected in an individual solutions pass and additional values at, (i) the base point length value plus 64% of an exploration step in the length direction and the base point diameter value plus 64% of an exploration step in the diameter direction, referred to as a plus-plus model, (ii) the base point length value plus 64% of an exploration step in the length direction and the base point diameter value minus 64% of an exploration step in the diameter direction, referred to as a plus-minus model, (iii) the base point length value minus 64% of an exploration step in the length direction and the base point diameter value plus 64% of an exploration step in the diameter direction, referred to as a minus-plus model, and (iv) the base point length value minus 64% of an exploration step in the length direction and the base point diameter value minus 64% of an exploration step in the diameter direction, referred to as a minus-minus model, as plotted on FIG. 7b.

It is noted that where two or more variables are considered in a simulation, any two or more variables may be combined while other variables are considered individually or separately in combination. Furthermore, the present invention contemplates dynamic combination of variables based on the degree of improvement in the result from the best solution of the previous pass. The dynamic combination could include, for example, any variable that changed in the best result of the previous pass combined with other unchanged variables. Alternately, any or all of the variables that changed in the best result of the previous pass may be combined. Moreover, any or all of the variables that changed in the last pass may be combined with any or all of the unchanged variables. For example, each unchanged variable may be combined with a combination of any or all of the variables that changed in the previous pass.

At 306, the tolerance method illustrated in FIG. 4 is applied to all variables.

As was previously discussed, variable sets that have been simulated may be stored in a database and newly determined variable sets may be compared to those previously simulated variable sets so that duplicate variable sets may be discarded and not simulated for a second time. Thus, at 308, the variable sets determined at 304 and 306 are compared to variable sets already simulated and at 310 non-duplicative variable sets are saved to the database.

At 311, if the number of runs created in an optimization pass exceeds the number of runs limit, then variable sets are either selected or de-selected until the number of simulations to be run is equal to the runs limit. Selection or de-selection may be based on a randomization. Moreover, the randomization may be seed based such that the results are repeatable or modifiable as desired.

At 312, a determination is made as to whether any additional simulations exist to be simulated around the current base point. Because the present embodiment is tolerance based, as solutions passes are performed a time may arise when all multiples of the tolerance around a base point have been explored. When all tolerance multiples around a base point have been explored, the solutions process will proceed to 322. If all tolerance multiples around a base point have not been explored the solutions process will proceed to 314.

At 314, simulations are run on each variable value set in a pass, and at 316 the latest simulation results are compared to previous simulation results to find the best simulation result to that time.

At 318, a determination is made as to whether one of the results of the last solutions pass is better than the previous best result and are greater than the previous best result by more than the threshold. If one of the results in the last solutions pass is the best result, then the base point is reset to the new point having the best result at 320 and the process returns to 304. If none of the results of the last solutions pass is the best result, the solutions process proceeds to 322. At 322, the current percentage is divided by two or some other factor and at 324 a decision is made as to whether the current percentage is less than the step delta end factor. If the current percentage is greater than or equal to the step delta end factor, the process returns to 304 to make another solutions pass at, for example, half the distance from the base point. If the current percentage is less than the step delta end factor the optimization terminates at 326. Of course, terminating at a percentage of the step delta end factor is not necessary, but it beneficially prevents simulations from continuing past a point where the benefit derived from further simulation is minimal.

The optimization results may be normalized. For example, results may be normalized to account for differences in the magnitude of each goal. Thus a normalized result might be based on the percent of the average result. Results may also be weighted so that one goal is given a greater weighting than another where goals are of varying importance.

One technique that may be used in connection with goals is referred to herein as "match design." Match design is a specification of a set of values, such as power or fuel consumption, for evaluating the results of a simulation by computing the least squares fit to produce an error value. Error values may furthermore be normalized, for example, to account for differences in the magnitude of the results for each goal. Thus a normalized error value might be based on the percent that the average results vary from a desired match. Error values may also be weighted such that one error value is given a greater weighting than another where goals are of varying importance.

Figure 8:
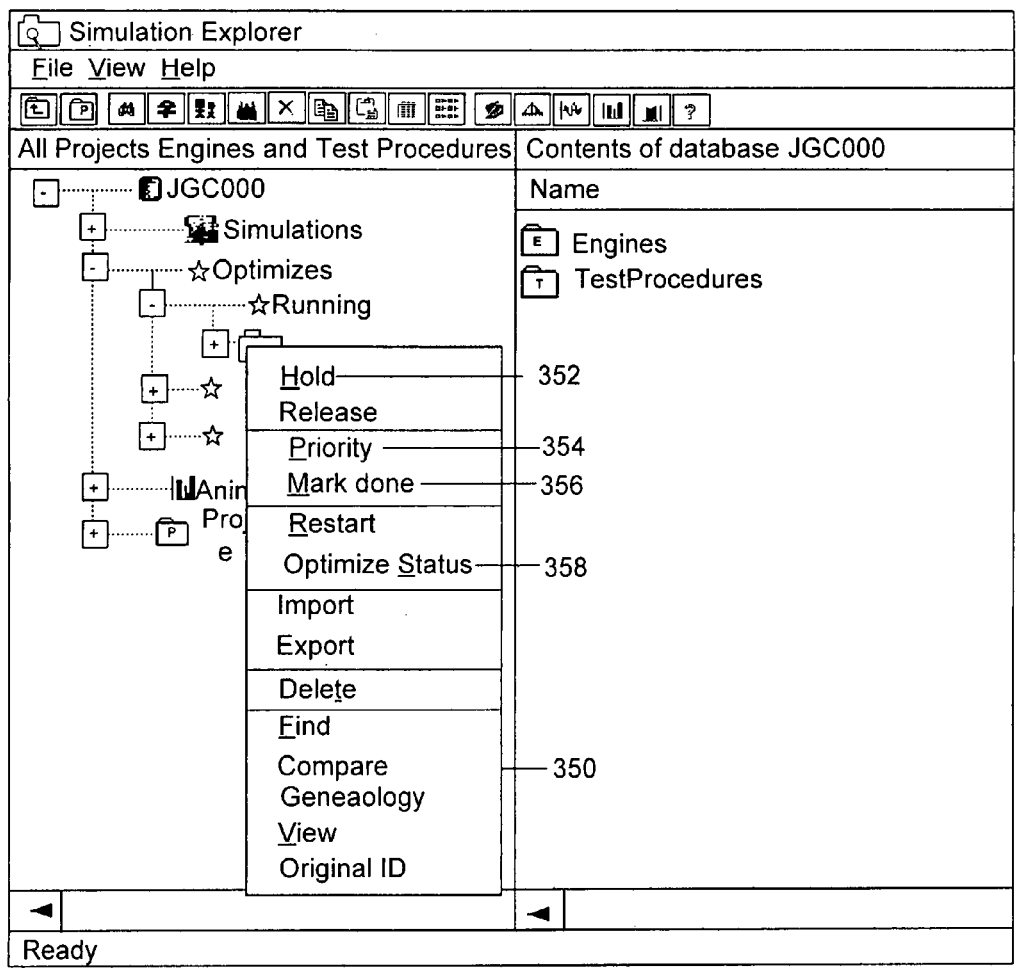
FIG. 8 illustrates a simulation explorer pop-up menu in an embodiment of the present invention.

FIG. 8 illustrates a simulation explorer pop-up menu 350 depicting processes that can occur asynchronously during simulation. Functions that may be selected from the simulation explorer pop-up menu 350 include hold 352, priority 354, mark done 356, and optimize status 358.

Hold 352 is a way for the user to temporarily pause the optimization. "Release" appears in place of "Hold" on the explorer pop-up menu 350 when the optimization is currently on hold. Priority 354 is the method for changing which optimization will run if more than one optimization is available to be processed.

Dynamic priority is an automatic process that the optimization uses to determine its own priority in relation to other optimizations that may be running concurrently. Dynamic priority could, for example, be the negative of the number of runs created in a pass, thus giving higher priority to a pass having a smaller amount of runs. Mark done 356 provides a way for the user to abort the optimization.

Optimize status 358 produces monitoring information when selected. For example, selection of optimize status 358 may cause the display of FIG. 9 to be displayed.

Figure 9:
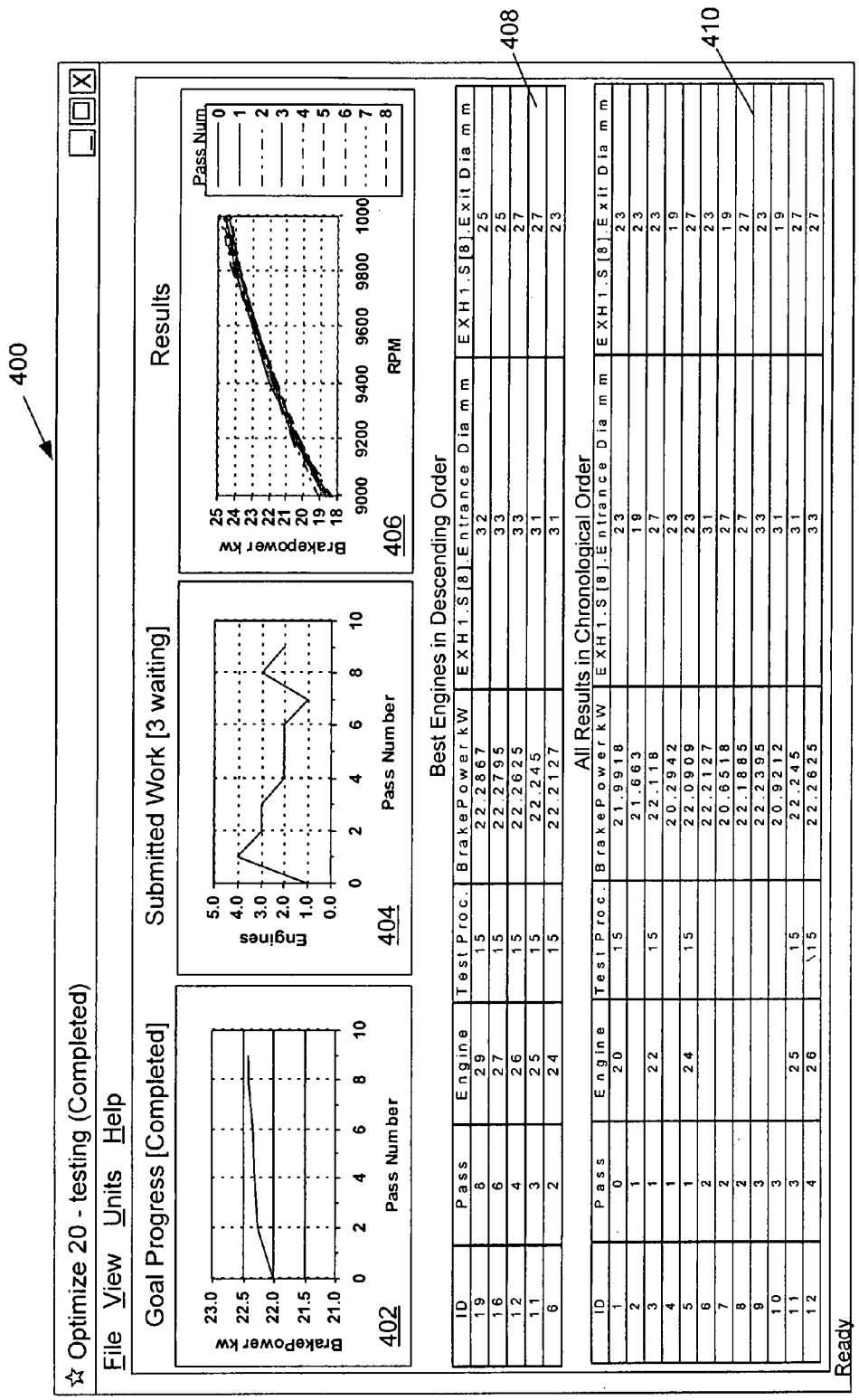
FIG. 9 is a screen that provides monitoring information during optimization in an embodiment of the present invention.

In a computer system or network of computer systems, simulations may run as a background task so as not to interfere with user activity. While the optimization is occurring, monitoring information 400 may be invoked. As illustrated in FIG. 9, such monitoring may include, for example, a graphical display of goal progress by pass number 402, submitted runs by pass number 404, a graph of the results of the initial best run and each better run by pass 406. Monitoring may also include a summary table 408 of the initial best run and each better run by pass including the variable set for that run 408 and a detail table 410 of every run performed by the optimization and the respective variable sets.

History may be provided for a completed optimization or an optimization in progress. The summary table 408 and detail table 410 are samples of history that may be provided. That history can be exported, printed or shown as a graph.

Figure 10:
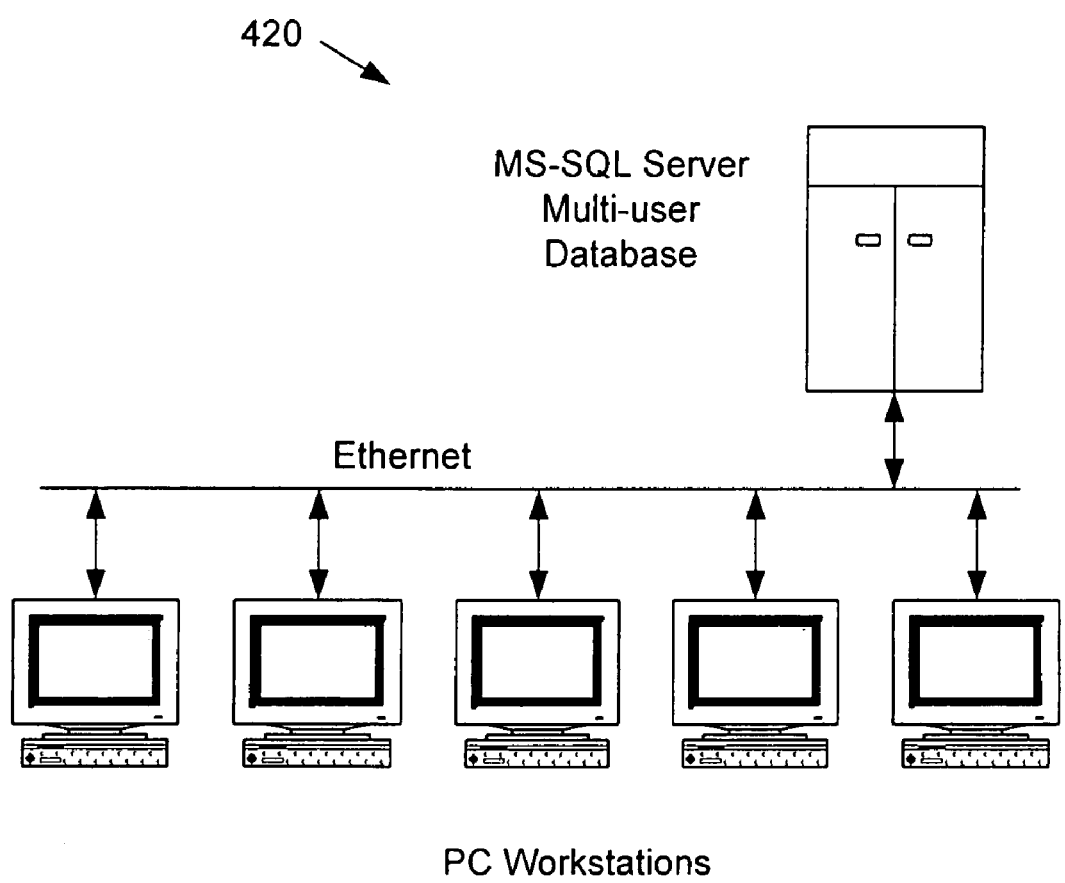
FIG. 10 is a distributed network utilized in an embodiment of the present invention.

The present invention may be performed by various methods including, for example, manually or by a general purpose computer. A computer system 420 for performing optimization on a distributed network is illustrated in FIG. 10. The network illustrated may include any number of processors, memory, and storage devices. The processors may be, for example, Pentium processors manufactured by Intel Corp. The processors may furthermore communicate one with another through communication devices coupled to a network, which may be, for example, a peer-to-peer network. Work to be performed by the network may be distributed by a database such as SQL Server database, produced by Microsoft Corp. The present invention may also be embodied on a computer readable medium.

Utilizing the network, when a group of simulations are ready to be performed, each simulation of a set of variables may be executed on a processor attached to the network. Each simulation may be placed in a table along with attributes such as, for example, what processor is performing the simulation, what time the simulation was placed in the table, whether the simulation has been completed, etc. Processors on the network may then access the table and perform the simulations as those processors are available. The simulation itself may be represented by a definition of a set of rules under which the simulation is to be performed (e.g., a particular commercially available engine), the variables to be optimized (e.g., exhaust pipe length and exhaust pipe diameter), and the goal (e.g., maximization of power over a range of 2000-10,000 rpm). In one embodiment, the processors are workstations available on desktops to perform tasks required by a user at each desktop. Each workstation that is not employed in a higher priority task by a user at its desktop, however, is available to perform one or more simulations. Thus an existing network of individual computers may perform their normal tasks and, when not employed in higher priority tasks, may perform simulations in the background.

Figure 11:
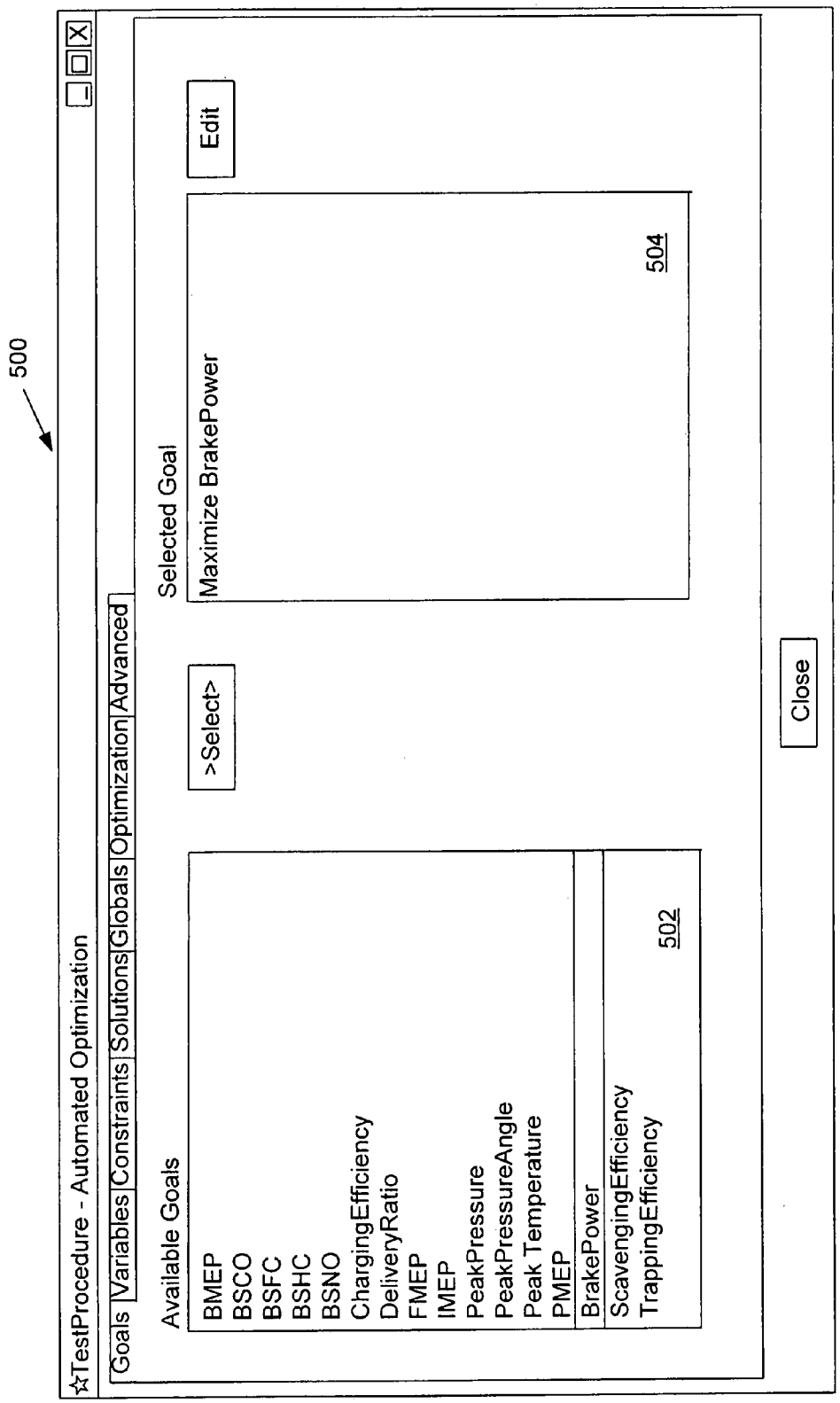
FIG. 11 is a goal setting screen in an embodiment of the present invention.

FIGS. 11 through 17 illustrate an embodiment of a system for specifying a design. FIG. 11 illustrates a goals setting screen 500. The goals setting screen includes a goal listing window 502 from which one or more performance characteristics may be selected and a selected goal window 504 listing performance characteristics with their respective directives.

Figure 12:
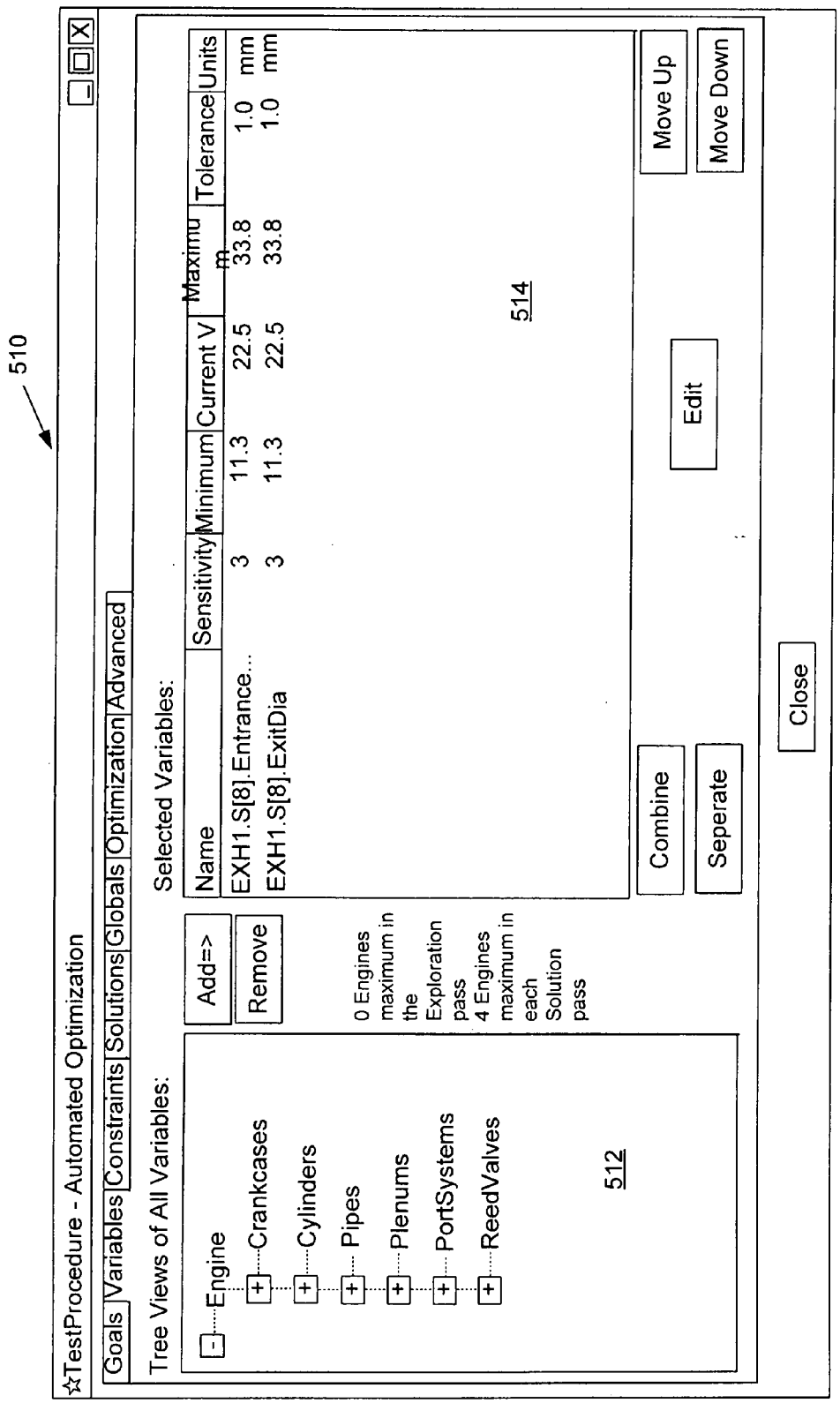
FIG. 12 is a variable setting screen in an embodiment of the present invention.

FIG. 12 illustrates a variable setting screen 510. The variable setting screen includes a variable selection window 512 containing a tree view of available variables and a selected variable listing 514 window listing each selected variable and their associated attributes.

Figure 13:
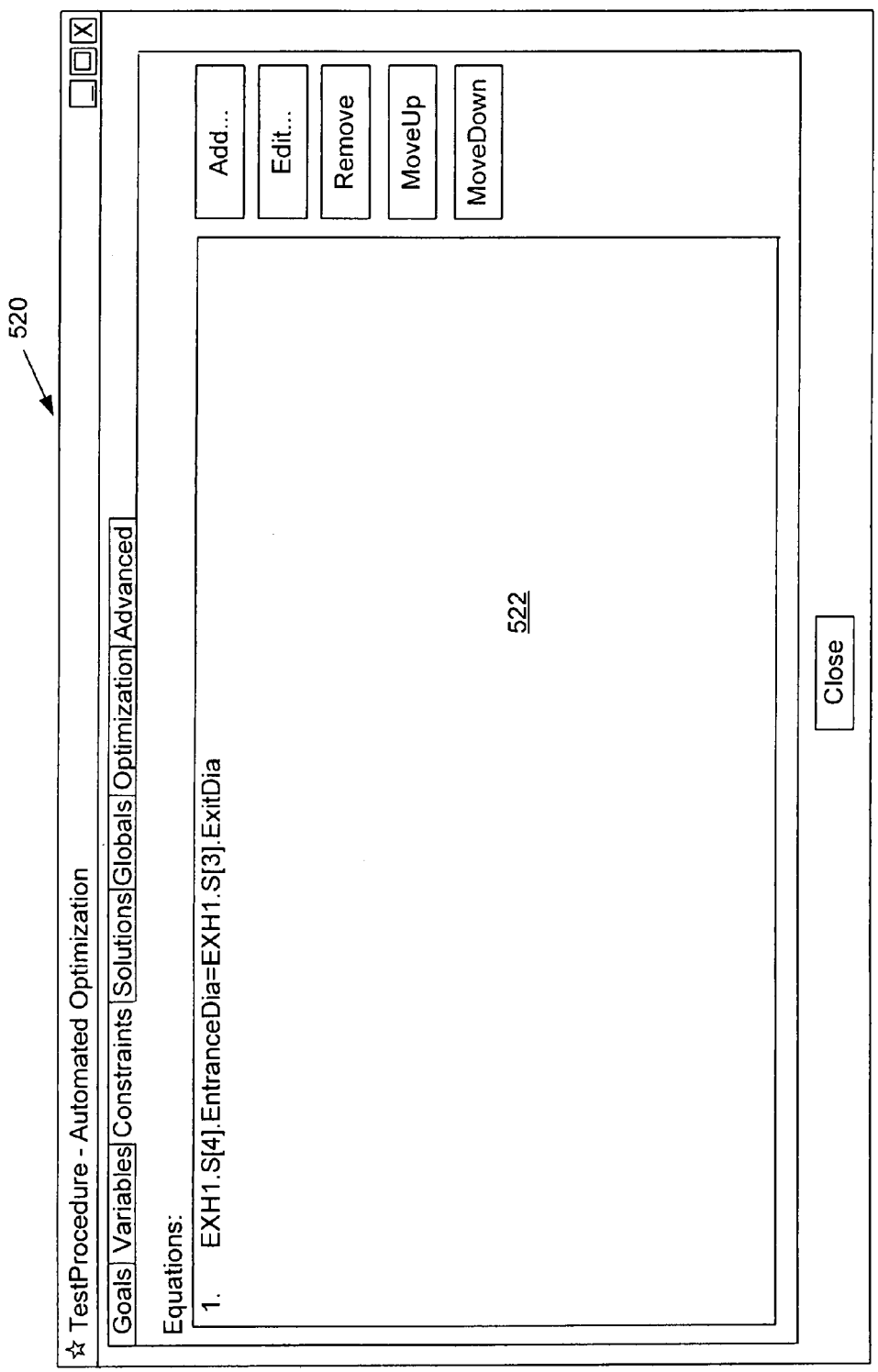
FIG. 13 is a constraints setting screen in an embodiment of the present invention.

FIG. 13 illustrates a constraints setting screen 520 listing a constraint in a set constraints window 522.

Figure 14:
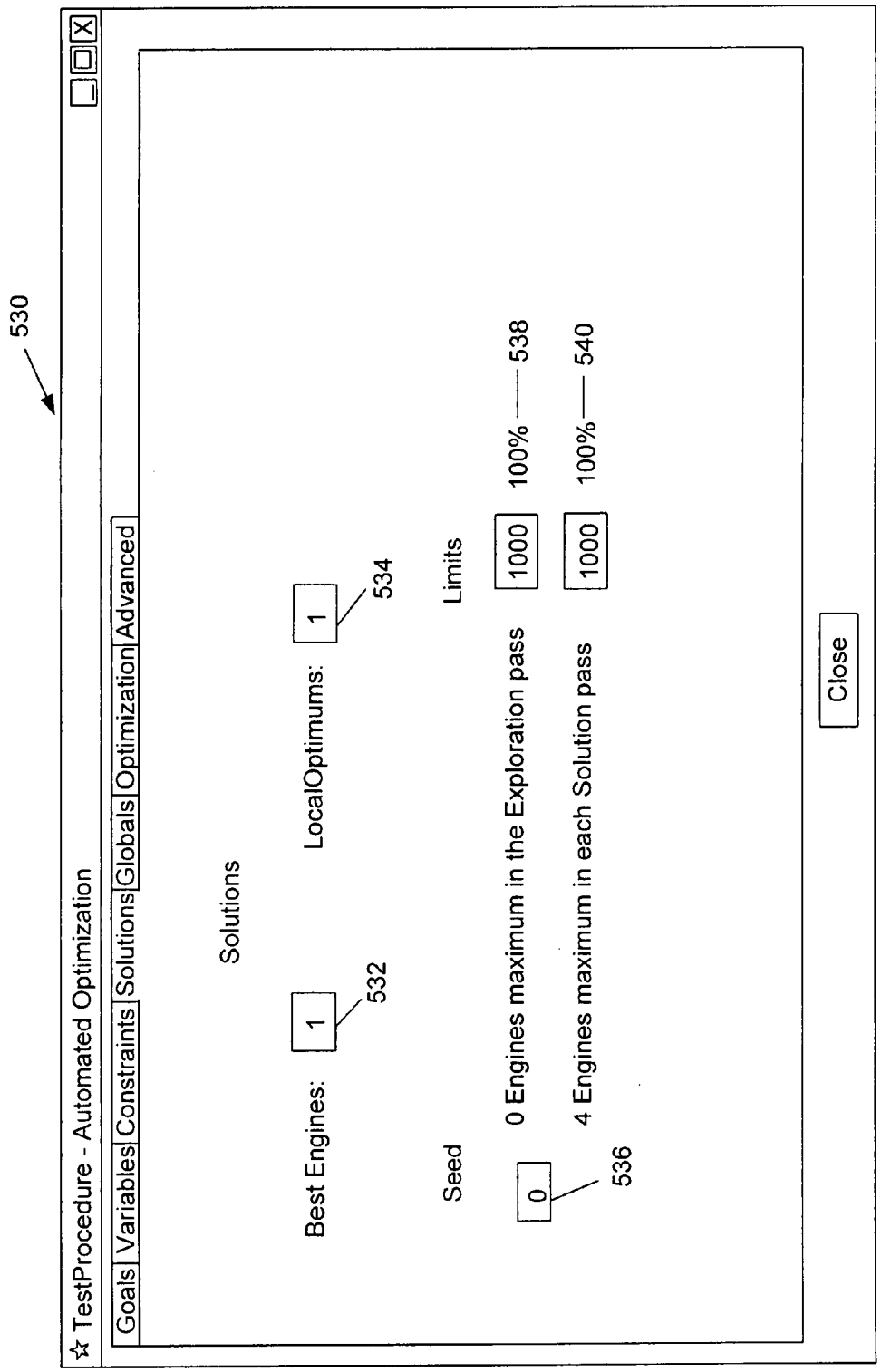
FIG. 14 is a solutions screen in an embodiment of the present invention.

FIG. 14 illustrates a solution screen 530. The solution screen 530 includes a best solutions dialog box 532 in which a number of best solutions (engines in the example shown) are entered, a local optimums dialog box 534 in which a number of local optimums desired is entered, a seed dialog box 536 in which a seed for randomization may be entered, an exploration pass dialog box 538 in which the maximum number of design configurations in the exploration pass is entered, and a solution pass dialog box 540 in which the maximum number of design configurations in a solution pass is entered.

Figure 15:
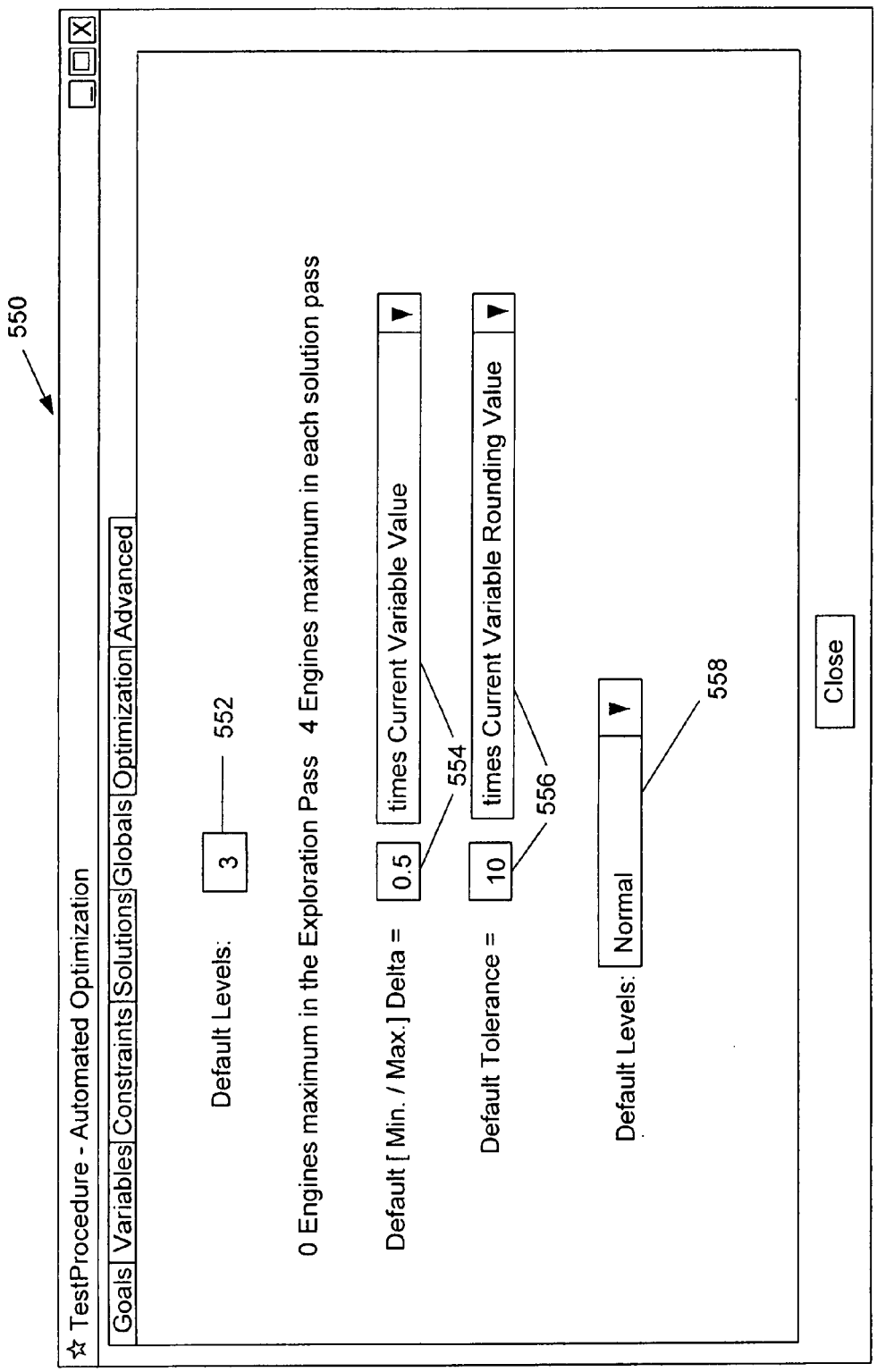
FIG. 15 is a global screen in an embodiment of the present invention.

FIG. 15 illustrates a global screen 550. The global screen 550 includes a default levels dialog box 552 in which the default number of levels desired may be entered. The global screen 550 also includes a pair of default delta dialog boxes 554 into which may be entered a default delta factor and a textual description of the formula used to compute the default delta. The default delta factor and formula determine the default delta. The default delta determines the default for the minimum and maximum values for every variable by adding and subtracting the default delta to the current value. The default delta in this example is 0.5 times the current variable value. Thus, if the current variable value is 200, then the minimum is equal to 200 minus the default delta of 100, or 100, and the maximum is equal to 200 plus the default delta of 100, or 300.

A pair of default tolerance dialog boxes 556 are also included in the global screen 550. The default tolerance dialog boxes 556 provide spaces in which factors that are used to compute a default tolerance factor and a textual description of the formula used to compute default tolerance may be entered. The default tolerance factor and formula determine the default tolerance for every variable. At 558, a textual description of the level is included. "Normal" in the context of the level textual description indicates a default level of 3. Thus, the default levels dialog box 552 and the textual description of the level 558 are tied such that a change in one will cause the other to change.

Figure 16:
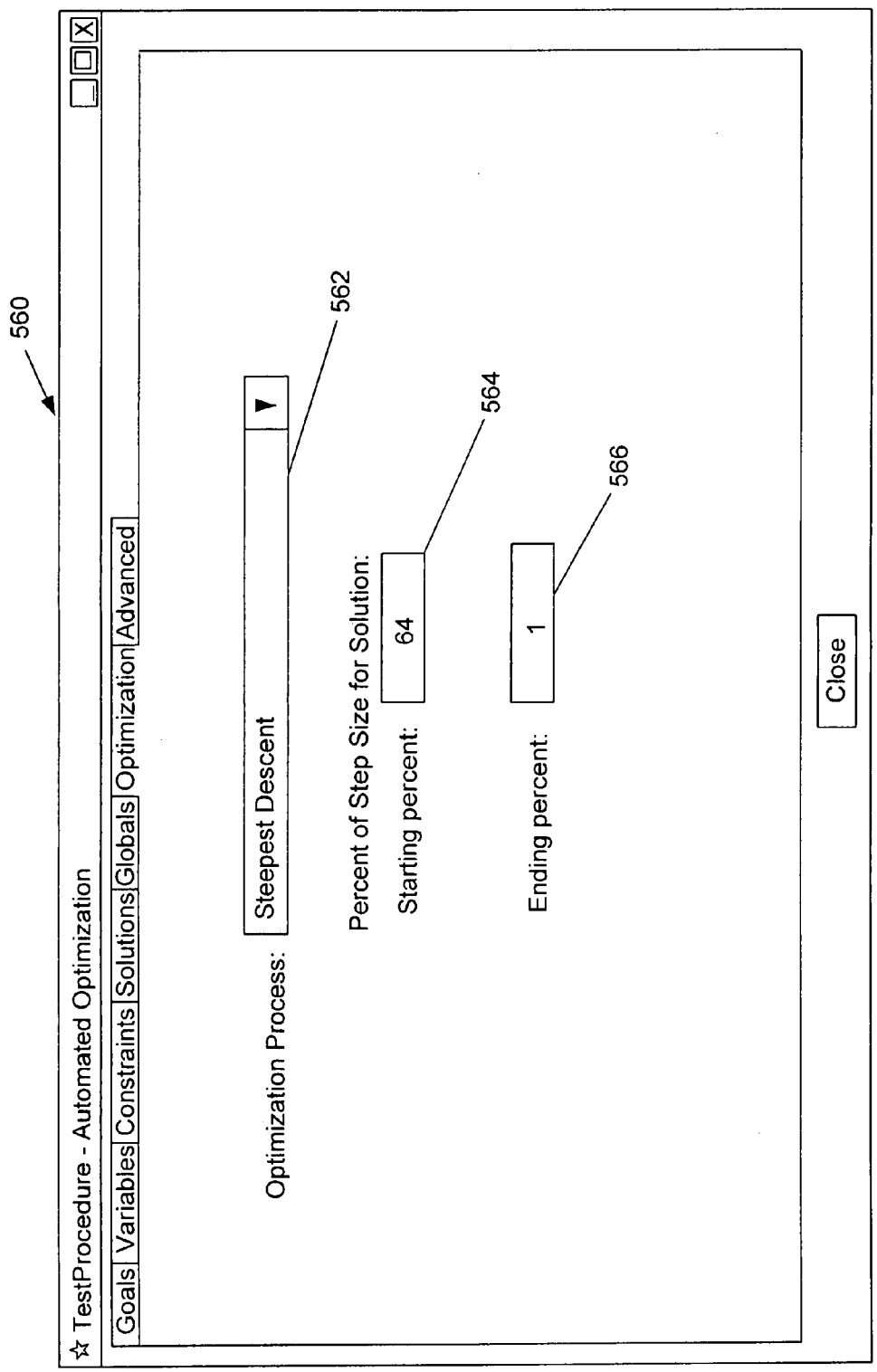
FIG. 16 is an optimization screen in an embodiment of the present invention.

FIG. 16 illustrates an optimization screen 560. The optimization screen includes an optimization process dialog box 562 in which the type of optimization desired is entered. At 564, a step delta starting factor is entered and at 566, a step delta ending factor is entered.

Figure 17:
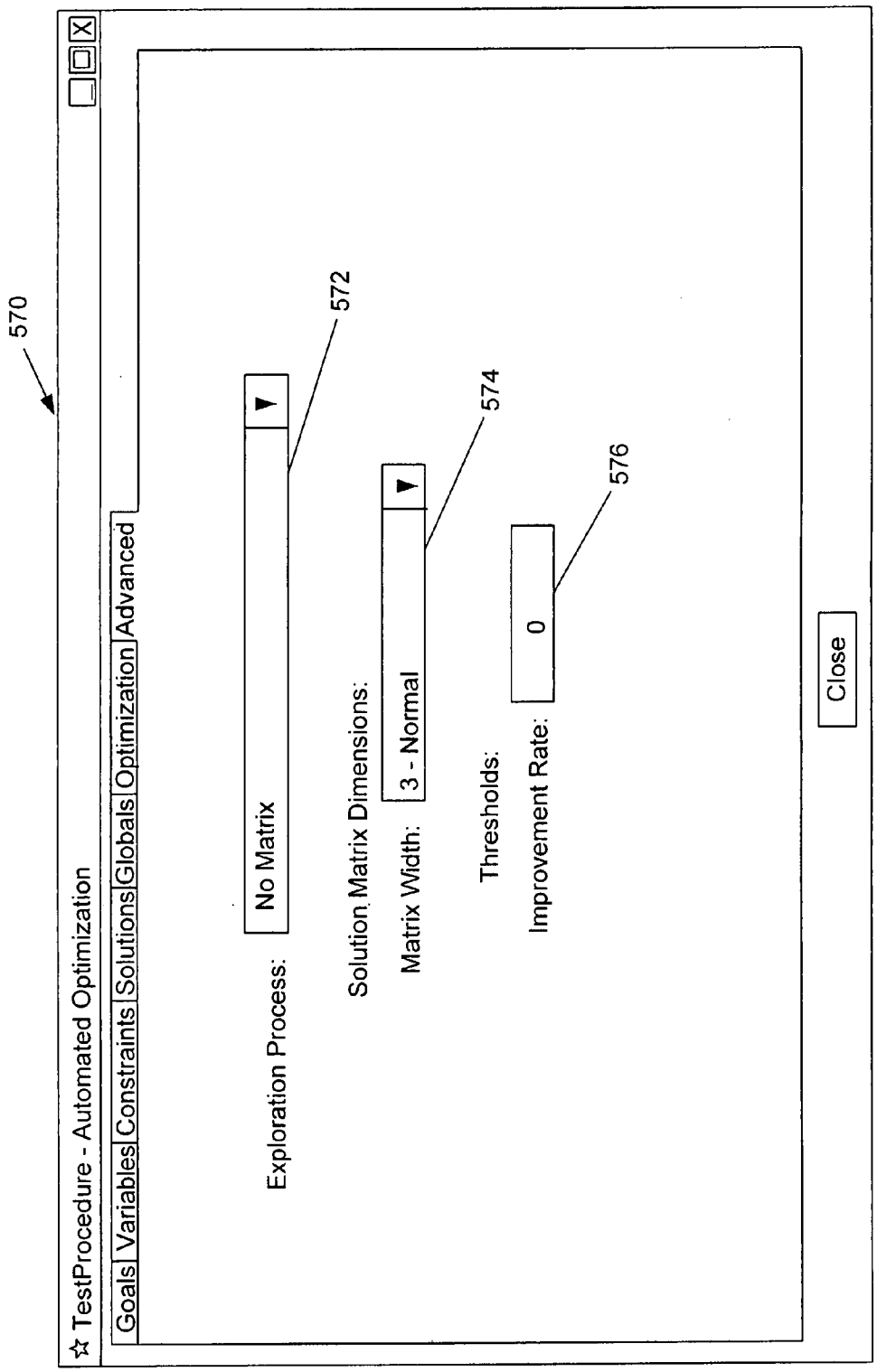
FIG. 17 is an advanced attribute screen in an embodiment of the present invention.

FIG. 17 illustrates an advanced attribute screen 570. That advanced attribute screen 570 includes an exploration process dialog box 572 that allows the exploration to be a "full matrix" that includes the edges of the design space, an "inside matrix" that does not have any points on the edge of the design space, or "no matrix" designates that no exploration will be performed. Also included in the advanced attribute screen 570 is a matrix width dialog box 574. A width of the matrix used during optimization may be entered in the matrix width dialog box 574. A typical value for matrix width might be three variable values for each variable. Also included in the advanced attribute screen 570 is a threshold improvement rate dialog box 576. That threshold can be used to terminate an optimization prior to a normal termination that would occur due to tolerances.

While the present invention has been disclosed with reference to certain embodiments, numerous modifications, alterations, and changes to the described embodiments are possible without departing from the scope of the present invention, as defined in the appended claims. Accordingly, it is intended that the present invention not be limited to the described embodiments, but that it have the full scope defined by the language of the following claims, and equivalents thereof.

What is claimed is:

1. A computer readable medium containing instructions that, when executed by a processor, cause the processor to perform a method for finding at least one local optimum model, the method comprising:
    a. specifying a base model that includes a variable having a value,
    b. specifying a goal which identifies a characteristic of the base model that is to be optimized;
    c. specifying a maximum number of optimizations to be performed;
    d. specifying a minimum value and a maximum value for the variable;
    e. specifying a list of different values for the variable between the minimum and maximum values for the variable;
    f. creating a model for every value of the variable included in the list;
    g. running each model created to determine a value of the characteristic for each model;
    h. comparing each model run with its adjacent model or models;
    i. identifying each model as a local model if the model has a better value of the characteristic than its adjacent model or models;
    j. ranking all local models identified;
    k. optimizing each local model to find a local optimum for each local model up to the maximum number of optimizations specified; and
    l. identifying and storing the at least one local optimum model.

2. A computer readable medium containing instructions that, when executed by a processor, cause the processor to perform a method for finding at least one local optimum model, the method comprising:
    a. specifying a base model that includes two or more variables each having a value,
    b. specifying a goal which identifies a characteristic of the base model that is to be optimized;
    c. specifying a maximum number of optimizations to be performed;
    d. specifying for each variable, a minimum value and a maximum value;
    e. specifying a list of different values for each variable between their minimum and maximum values;
    f. creating a model for combinations of the values of the variables included in the list;
    g. running each model created to determine a value of the characteristic for each model;
    h. comparing each model run with its adjacent model or models;
    i. identifying each model as a local model if the model has a better value of the characteristic than its adjacent model or models;
    j. ranking all local models identified;
    k. optimizing the highest ranked local models to find the local optimum model up to the maximum number of optimizations specified; and
    l. storing the local optimum model for each of the highest ranked local models.

3. A computer readable medium containing instructions that, when executed by a processor, cause the processor to perform an optimization method, the method comprising:
    a. specifying a characteristic to be optimized and a desired value for the characteristic;
    b. specifying a variable to be varied during the optimization;
    c. setting a design tolerance equal to a minimum increment by which the variable is to be varied;
    d. selecting a design configuration that includes a value for the variable and all other values necessary to simulate the design configuration as a base design configuration;
    e. simulating the design configuration to arrive at a value for the characteristic;
    f. selecting design configurations having variable values adjacent to the base design configuration variable value;
    g. simulating the selected design configurations;
    h. setting the base design configuration variable value to the design configuration value of an adjacent design configuration having a characteristic value nearest to the desired characteristic value if an adjacent design configuration has a characteristic value nearer to the desired characteristic than the base design configuration;
    i. selecting design configurations having variable values more nearly adjacent to the base design configuration variable value if no adjacent design configuration has a characteristic value nearer to the desired characteristic value than the base design configuration;
    j. repeating steps g, h, and i until all design configurations having variable values adjacent to the base design configuration by one design tolerance have been simulated and the characteristic value of the base design configuration is nearer the desired characteristic value than any other design configuration simulated; and
    k. storing the base design configuration variable value.

4. The computer readable medium of claim 3, wherein the desired value of the goal is a plurality of values.

5. The computer readable medium of claim 3, wherein a second variable is varied during optimization.

6. The computer readable medium of claim 3, wherein adjacent variable values include a variable value greater than the base design configuration variable value and a variable value less than the base design configuration variable value.

7. The computer readable medium of claim 6, wherein the variable value greater than the base design configuration variable value is equal to the base design configuration variable value plus an increment and the variable value less than the base design configuration variable value is equal to the base design configuration variable value less the increment.

8. The computer readable medium of claim 7, wherein the increment is reduced each time step i is performed.

9. A computer readable medium containing instructions that, when executed by a processor, cause the processor to perform a method for selecting a best value for a variable in a model, the method comprising:
    a. specifying a model that includes an input variable having a tolerance and a step having an initial magnitude greater than the tolerance, and specifying an output characteristic having an objective;
    b. running the model with the input variable set to a selected value to arrive at a resulting output characteristic;

c. running the model with the input variable set to the selected value changed by the step to arrive at a second resulting output characteristic;
d. selecting the input variable value that results in an output characteristic that more nearly conforms to the objective;
e. reducing the step if the selected input variable value is unchanged at d;
f. setting the step equal to the tolerance if the step would otherwise be reduced to less than the tolerance;
g. repeating c through f until the step reaches the tolerance; and
h. storing the selected input variable value.

10. A computer readable medium containing instructions that, when executed by a processor, cause the processor to perform a method for selecting a best value for a variable in a model, the method comprising:
a. specifying a model that includes an input variable having a tolerance and a step having an initial magnitude greater than the tolerance, and specifying an output characteristic having an objective;
b. running the model with the input variable set to a selected value to arrive at a resulting output characteristic;
c. running the model with the input variable set to the selected value changed by the step to arrive at a second resulting output characteristic;
d. selecting the input variable value that results in an output characteristic that more nearly conforms to the objective;
e. selecting the input variable value changed by a step if the output characteristic resulting when the selected input variable is set to the selected value and the output characteristic resulting when the selected input variable is set to the selected value changed by the step are the same;
f. reducing the step if the selected input variable value is unchanged at d and e;
g. repeating c through f until the step reaches the tolerance; and
h. storing the selected input variable value.

11. A computer readable medium containing instructions that, when executed by a processor, cause the processor to perform a method for selecting a best value for a variable in a model, the method comprising:
a. specifying a model that includes an input variable having a tolerance and a step having an initial magnitude greater than the tolerance, and specifying an output characteristic having an objective;
b. running the model with the input variable set to a selected value to arrive at a resulting output characteristic;
c. running the model with the input variable set to the selected value changed by the step to arrive at a second resulting output characteristic;
d. selecting the input variable value that results in an output characteristic that more nearly conforms to the objective, wherein the output characteristic that more nearly conforms to the objective is the output characteristic having the largest value;
e. reducing the step if the selected input variable value is unchanged at d;
f. repeating c through e until the step reaches the tolerance; and
g. storing the selected input variable value.

12. A computer readable medium containing instructions that, when executed by a processor, cause the processor to perform a method for selecting a best value for a variable in a model, the method comprising:
a. specifying a model that includes an input variable having a tolerance and a step that is an integer multiple of the tolerance and has an initial magnitude greater than the tolerance, and specifying an output characteristic having an objective;
b. running the model with the input variable set to a selected value to arrive at a resulting output characteristic;
c. running the model with the input variable set to the selected value changed by the step to arrive at a second resulting output characteristic;
d. selecting the input variable value that results in an output characteristic that more nearly conforms to the objective;
e. reducing the step if the selected input variable value is unchanged at d;
f. repeating c through e until the step reaches the tolerance; and
g. storing the selected input variable value.

13. A computer readable medium containing instructions that, when executed by a processor, cause the processor to perform a method for selecting a best value for a variable in a model, the method comprising:
a. specifying a model that includes a first input variable having a first tolerance and a first step having an initial magnitude greater than the first tolerance, specifying a second input variable having a second tolerance equal to the first tolerance and a second step equal to the first step, the second step having an initial magnitude equal to the first initial magnitude and greater than the second tolerance, and specifying an output characteristic having an objective;
b. running the model with the first input variable set to a first selected value and the second input variable set to a second selected value to arrive at a resulting output characteristic;
c. running the model with the first input variable set to the first selected value changed by the first step and the second input variable set to the second selected value changed by the second step to arrive at a second resulting output characteristic;
d. selecting the first input variable value and the second input variable value that result in an output characteristic that more nearly conforms to the objective;
e. reducing the first step and the second step if the first selected input variable value and the second selected input variable value are both unchanged at d;
f. repeating c through e until the first step reaches the first tolerance and the second step reaches the second tolerance; and
g. storing the selected first input variable value and the selected second input variable value.

14. A computer readable medium containing instructions that, when executed by a processor, cause the processor to perform a method for selecting a best value for a variable in a model, the method comprising:
a. specifying a model that includes an input variable having a tolerance and a step having an initial magnitude greater than the tolerance, wherein the input variable is a dimension of a component of a machine and the model simulates the machine including that component, and specifying an output characteristic having an objective;

b. running the model with the input variable set to a selected value to arrive at a resulting output characteristic;

c. running the model with the input variable set to the selected value changed by the step to arrive at a second resulting output characteristic;

d. selecting the input variable value that results in an output characteristic that more nearly conforms to the objective;

e. reducing the step if the selected input variable value is unchanged at d;

f. repeating c through e until the step reaches the tolerance; and g. storing the selected input variable value.

15. A computer readable medium containing instructions that, when executed by a processor, cause the processor to perform a method for finding a variable value that results in an optimum value for an output characteristic by varying the magnitude of the variable value, the method comprising:

a. setting the variable to a base value;

b. setting a tolerance to a minimum step;

c. determining a first output characteristic value with the variable set to the base value;

d. determining a second output characteristic value with the variable set to the base value plus a whole number multiple of the tolerance;

e. choosing one of the first output characteristic value and the second output characteristic value, whichever is nearest a desired output characteristic value; dimension of a component of a machine and the model simulates the machine including that component, and specifying an output characteristic having an objective;

b. running the model with the input variable set to a selected value to arrive at a resulting output characteristic;

c. running the model with the input variable set to the selected value changed by the step to arrive at a second resulting output characteristic;

d. selecting the input variable value that results in an output characteristic that more nearly conforms to the objective;

e. reducing the step if the selected input variable value is unchanged at d;

f. repeating c through e until the step reaches the tolerance;

g. storing the selected input variable value.

f. setting the base value to the variable value providing the chosen output characteristic value;

g. reducing the whole number multiple if the base value is unchanged;

h. repeating d through g until the whole number multiple is one: and i. storing the variable value.

16. The computer readable medium of claim 15, wherein the whole number is a negative number.

17. The computer readable medium of claim 15, wherein the whole number is a positive number and further comprising determining a third goal value with the variable set to the base value minus the whole number multiplied by the tolerance.

18. The computer readable medium of claim 15, wherein setting the base value to the variable value providing the chosen output characteristic value includes leaving the base value at the current value if the base value was previously set to the chosen output characteristic value.

19. The computer readable medium of claim 15, further comprising limiting the number of values determined for the goal to a predefined number of goal values.

20. The computer readable medium of claim 15, wherein the variables for which goal values are to be calculated are selected randomly.

21. The computer readable medium of claim 20, wherein the variables for which goal values are to be calculated are selected based on a Monte Carlo form of selection.

22. The computer readable medium of claim 20, wherein the selection utilizes a seed.

23. The computer readable medium of claim 15, further comprising setting the variable to the base value plus a reduced whole number multiple of the tolerance if the first goal value is nearer to the desired goal value than the second goal value.

24. The computer readable medium of claim 15, further comprising setting the variable to the second goal value plus the whole number multiple of the tolerance if the second goal value is nearer to the desired goal value than the first goal value.

25. The computer readable medium of claim 15, wherein determining an output characteristic value includes simulating the output characteristic with the value to which the variable is set.

26. The computer readable medium of claim 15, further comprising a display depicting the proximity of the output characteristic value nearest to the desired output characteristic value.

27. The computer readable medium of claim 26, wherein a user may terminate the optimization method.

28. The computer readable medium of claim 15, further comprising:

setting a second variable to a second base value; and wherein the first output characteristic value is determined with the variable set to the base value and the second variable set to the second base value.

29. The computer readable medium of claim 28, wherein the tolerance for the variable is different than a tolerance utilized with the second variable.

30. The computer readable medium of claim 15, further comprising setting a minimum boundary for the variable below which optimization will not be performed.

31. The computer readable medium of claim 15, further comprising setting a maximum boundary for the variable above which optimization will not be performed.

32. The computer readable medium of claim 15, wherein at least a second output characteristic is optimized simultaneously.

33. The computer readable medium of claim 15, wherein the variable value is a dimension of a component of a machine and the output characteristic is an operating characteristic of the machine.

34. The computer readable medium of claim 15, wherein the desired output characteristic value is a predetermined value.

35. The computer readable medium of claim 15, wherein the desired output characteristic value is a predetermined set of values.

36. The computer readable medium of claim 15, wherein the optimum output characteristic value is one that nearly matches a predefined value for the output characteristic.

37. The computer readable medium of claim 15, wherein the desired output characteristic value is a greatest value determined for the output characteristic.

38. The computer readable medium of claim 15, wherein the desired output characteristic value is a lowest value determined for the output characteristic.

39. The computer readable medium of claim 15, wherein the step is a minimum amount the variable is desired to be varied.

40. The computer readable medium of claim 15, wherein the step is a predetermined value.

* * * * *

UNITED STATES PATENT AND TRADEMARK OFFICE
CERTIFICATE OF CORRECTION

| | |
|---|---|
| PATENT NO. | : 7,260,516 B1 |
| APPLICATION NO. | : 10/231338 |
| DATED | : August 21, 2007 |
| INVENTOR(S) | : Glen F. Chatfield and John G. Crandall |

It is certified that error appears in the above-identified patent and that said Letters Patent is hereby corrected as shown below:

Column 21, lines 33 through 52: Cancel the text beginning with "dimension of a component of a machine" and ending with "g. storing the selected input variable value."

Column 21, line 59: Replace the colon after "whole number multiple is one" with a semicolon.

Signed and Sealed this

Twenty-ninth Day of July, 2008

JON W. DUDAS
*Director of the United States Patent and Trademark Office*